United States Patent
Chen et al.

(10) Patent No.: US 12,313,927 B2
(45) Date of Patent: May 27, 2025

(54) DECORATION PANEL AND DISPLAY APPARATUS

(71) Applicant: AUO Corporation, Hsinchu (TW)

(72) Inventors: Chien-Chuan Chen, Hsinchu (TW);
Wei-Jen Su, Hsinchu (TW); Hsin Chiang Chiang, Hsinchu (TW);
Chun-Han Lee, Hsinchu (TW);
Peng-Yu Chen, Hsinchu (TW);
Ko-Ruey Jen, Hsinchu (TW);
Yung-Chih Chen, Hsinchu (TW)

(73) Assignee: AUO Corporation, Hsinchu (TW)

( * ) Notice: Subject to any disclaimer, the term of this patent is extended or adjusted under 35 U.S.C. 154(b) by 25 days.

(21) Appl. No.: 18/513,666

(22) Filed: Nov. 20, 2023

(65) Prior Publication Data

US 2024/0168324 A1 May 23, 2024

(30) Foreign Application Priority Data

Nov. 21, 2022 (TW) .................. 111144354

(51) Int. Cl.
*G02F 1/1333* (2006.01)
*G02F 1/1337* (2006.01)
(Continued)

(52) U.S. Cl.
CPC .... *G02F 1/133371* (2013.01); *G02F 1/13338* (2013.01); *G02F 1/133707* (2013.01);
(Continued)

(58) Field of Classification Search
CPC ............ G02F 1/13478; G02F 1/13718; G02F 1/133371; G02F 1/133776;
(Continued)

(56) References Cited

U.S. PATENT DOCUMENTS

2002/0027630 A1* 3/2002 Yamada ............ G02F 1/133753
349/123
2009/0244413 A1* 10/2009 Ishikawa ............. G02F 1/13718
349/35
(Continued)

FOREIGN PATENT DOCUMENTS

| CN | 104777651 | 7/2015 |
|---|---|---|
| CN | 206773361 | 12/2017 |
| CN | 113325622 | 8/2021 |
| JP | 2004245976 | 9/2004 |

*Primary Examiner* — Paisley L Wilson
(74) *Attorney, Agent, or Firm* — JCIPRNET

(57) ABSTRACT

A decoration panel includes a first substrate, a first transparent conductive element, a transparent structure, a second substrate, a second transparent conductive element, and a first cholesteric liquid crystal layer. The first transparent conductive element is disposed on the first substrate. The transparent structure is disposed on the first substrate. The second substrate is disposed opposite to the first substrate. The second transparent conductive element is disposed on the second substrate. The first cholesteric liquid crystal layer is disposed between the first transparent conductive element and the second transparent conductive element. A display apparatus is adapted to render a decoration pattern, and the decoration pattern corresponds to the transparent structure. Moreover, a display apparatus including the decoration panel is also provided.

18 Claims, 25 Drawing Sheets

(51) Int. Cl.
  G02F 1/1347 (2006.01)
  G02F 1/137 (2006.01)
  G06F 3/041 (2006.01)
  G06F 3/044 (2006.01)
  G02F 1/1343 (2006.01)

(52) U.S. Cl.
  CPC .... G02F 1/133776 (2021.01); G02F 1/13473 (2013.01); G02F 1/13478 (2021.01); G02F 1/13718 (2013.01); G06F 3/0412 (2013.01); G06F 3/0445 (2019.05); G06F 3/0446 (2019.05); *G02F 1/13439* (2013.01); *G02F 1/137* (2013.01); *G02F 2201/44* (2013.01); *G06F 3/0448* (2019.05)

(58) Field of Classification Search
  CPC ........... G02F 1/133707; G02F 1/13338; G06F 3/0412; G06F 3/0445; G06F 3/0446; G06F 3/0448
  See application file for complete search history.

(56) References Cited

U.S. PATENT DOCUMENTS

| | | | | |
|---|---|---|---|---|
| 2009/0322665 | A1* | 12/2009 | Yoshihara | G02F 1/1347 |
| | | | | 345/94 |
| 2014/0043572 | A1* | 2/2014 | Tang | G02F 1/1337 |
| | | | | 349/123 |
| 2015/0015803 | A1* | 1/2015 | Wang | G06F 3/0445 |
| | | | | 349/12 |

* cited by examiner

DECORATION PANEL AND DISPLAY APPARATUS

CROSS-REFERENCE TO RELATED APPLICATION

This application claims the priority benefit of Taiwan application serial no. 111144354, filed on Nov. 21, 2022. The entirety of the above-mentioned patent application is hereby incorporated by reference herein and made a part of this specification.

BACKGROUND

Technical Field

The disclosure relates to a photoelectric panel and a photoelectric apparatus; more particularly, the disclosure relates to a decoration panel and a display apparatus.

Description of Related Art

In recent years, the electric vehicle market has witnessed significant growth. The electric vehicles typically employ a substantial number of display apparatuses to display convey driving and entertainment information to users. To create a cohesive ambiance within the vehicle cabin, many of these display apparatuses feature decoration films that can exhibit a pattern like wood grain or checkerboard designs on the surface of the display apparatuses. However, regardless of whether the display apparatus is active or not, the decoration pattern on the display apparatuses remains constantly visible, and such a lack of user control restricts the ability to choose when the decoration pattern is presented, limiting customization based on the individual needs and preferences of the users.

SUMMARY

The disclosure provides a decoration panel capable of rendering or not rendering a decoration pattern according to users' choices.

The disclosure provides a display apparatus capable of rendering or not rendering a decoration pattern according to users' choices.

In an embodiment of the disclosure, a decoration panel includes a first substrate, a first transparent conductive element, a transparent structure, a second substrate, a second transparent conductive element, and a first cholesteric liquid crystal layer. The first transparent conductive element is disposed on the first substrate. The transparent structure is disposed on the first substrate. The second substrate is disposed opposite to the first substrate. The second transparent conductive element is disposed on the second substrate. The first cholesteric liquid crystal layer is disposed between the first transparent conductive element and the second transparent conductive element. The decoration panel is adapted to render a decoration pattern, and the decoration pattern corresponds to the transparent structure.

In an embodiment of the disclosure, a display apparatus includes the above-mentioned decoration panel and a display panel. The decoration panel is disposed above the display panel. The display apparatus is adapted to render a decoration pattern, and the decoration pattern corresponds to the transparent structure.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
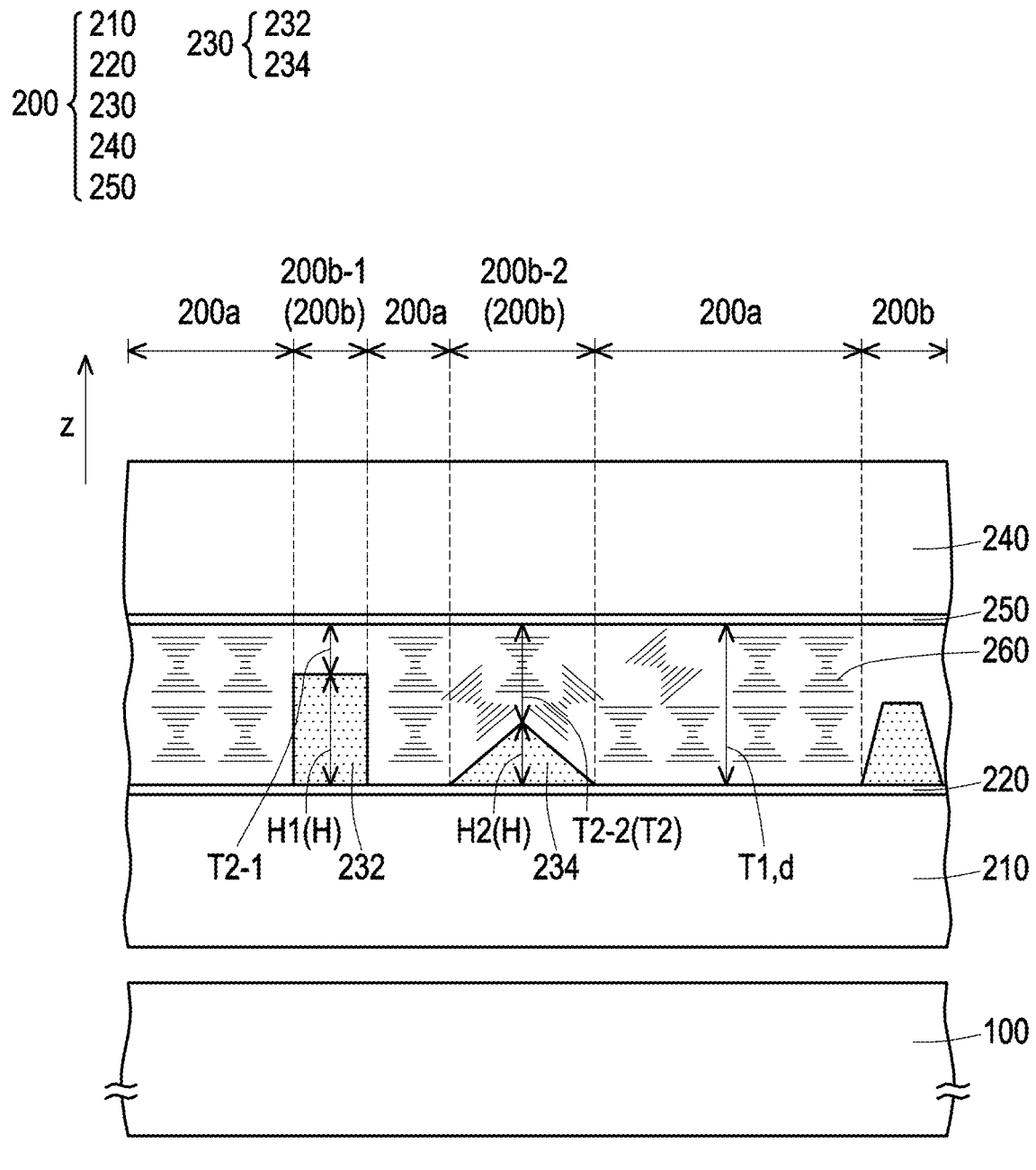
FIG. 1 is a schematic cross-sectional diagram of a display apparatus according to an embodiment of the disclosure.

Reference will now be made in detail to the exemplary embodiments of the disclosure, and examples of the exemplary embodiments are illustrated in the accompanying drawings. Whenever possible, the same reference numbers are used in the drawings and descriptions to indicate the same or similar parts.

It should be understood that when an element, such as a layer, a film, a region, or a substrate is referred to as being "on" or "connected to" another element, it can be directly on or connected to the another element, or an intermediate element may also be present. By contrast, when an element is referred to as being "directly on" or "directly connected to" another element, no intermediate element is present. As used herein, being "connected" may refer to a physical and/or electrical connection. Furthermore, being "electrically connected" or "coupled" may refer to the presence of other elements between the two elements.

The terminology "about," "approximately," or "substantially" used herein includes the average of the stated value and an acceptable range of deviations from the particular value as determined by those skilled in the art. For instance, the terminology "about" may refer to as being within one or more standard deviations of the stated value, or within ±30%, ±20%, ±10%, or ±5%. Furthermore, the terminology "about," "approximately," or "substantially" as used herein may be chosen from a range of acceptable deviations or standard deviations depending on the optical properties, etching properties, or other properties, rather than one standard deviation for all properties.

Unless otherwise defined, all terminologies (including technical and scientific terminologies) used herein have the same meaning as commonly understood by people having ordinary skill in the art to which the disclosure belongs. It is understood that these terminologies, such as those defined in commonly used dictionaries, should be interpreted as having meanings consistent with the relevant art and the background or context of the disclosure, and should not be interpreted in an idealized or overly formal way, unless otherwise defined in the embodiments of the disclosure.

Figure 2:
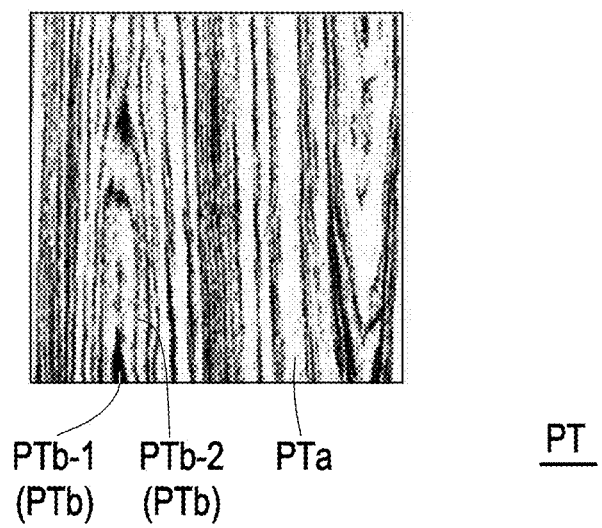
FIG. 2 is a schematic diagram of a decoration pattern according to an embodiment of the disclosure.

FIG. 1 is a schematic cross-sectional diagram of a display apparatus according to an embodiment of the disclosure. FIG. 2 is a schematic diagram of a decoration pattern according to an embodiment of the disclosure.

With reference to FIG. 1, a display apparatus 10 includes a decoration panel 200. In this embodiment, the display apparatus 10 further includes a display panel 100 disposed behind the decoration panel 200. With reference to FIG. 1 and FIG. 2, the decoration panel 200 is configured to render a decoration pattern PT, and the display panel 100 is configured to display information. For instance, in this embodiment, the display apparatus 10 may be optionally applied in a vehicle field, the decoration pattern PT presented by the decoration panel 200 is, for instance, a wood grain pattern, and the display information of the display panel 100 is, for instance, driving information, such as speed, map, and so on, which should however not be construed as a limitation in the disclosure. In this embodiment, the display panel 100 may be a self-luminous display panel (e.g., a micro light emitting diode display, an organic light emitting diode display, and so forth) or a non-self-luminous display panel (e.g., a liquid crystal display panel or the like), which should however not be construed as a limitation in the disclosure.

With reference to FIG. 1, the decoration panel 200 includes a first substrate 210. The first substrate 210 is transparent. For instance, in this embodiment, a material of the first substrate 210 may include glass, quartz, an organic polymer, or any other appropriate materials.

The decoration panel 200 further includes a first transparent conductive element 220 disposed on the first substrate 210. In this embodiment, the first transparent conductive element 220 is a conductive pattern covering the entire surface and may be overlapped with a plurality of pixels (not shown) of the display panel 100. For instance, in this embodiment, a material of the first transparent conductive element 220 may include metal oxides, such as indium tin oxide (ITO), indium zinc oxide (IZO), aluminum tin oxide (ATO), aluminum zinc oxide (AZO), indium gallium zinc oxide (IGZO), any other appropriate oxide, or a stacked layer containing at least two of the above-mentioned materials, which should however not be construed as a limitation in the disclosure.

The decoration panel 200 further includes a transparent structure 230 disposed on the first substrate 210. For instance, in this embodiment, the transparent structure 230 may be optionally disposed on the first transparent conductive element 220, and the first transparent conductive element 220 is located between the transparent structure 230 and the first substrate 210, which should however not be construed as a limitation in the disclosure. The transparent structure 230 may be conductive or insulating. For instance, in this embodiment, the transparent structure 230 may be insulating, and a material of the transparent structure 230 includes but is not limited to an organic material, for instance. However, the disclosure is not limited to what is described above, and in another embodiment, the transparent structure 230 may also be conductive; the material of the transparent structure 230 includes but is not limited to ITO, for instance.

The decoration panel 200 further includes a second substrate 240 disposed opposite to the first substrate 210. The second substrate 240 is transparent. For instance, in this embodiment, a material of the second substrate 240 may include glass, quartz, an organic polymer, or any other appropriate material.

The decoration panel 200 further includes a second transparent conductive element 250 disposed on the second substrate 240. In this embodiment, the second transparent conductive element 250 is a conductive pattern covering the entire surface and may be overlapped with a plurality of pixels (not shown) of the display panel 100. For instance, in this embodiment, a material of the second transparent conductive element 250 may include metal oxides, such as ITO, IZO, ATO, AZO, IGZO, any other appropriate oxide, or a stacked layer containing at least two of the above-mentioned materials, which should however not be construed as a limitation in the disclosure.

The decoration panel 200 further includes a first cholesteric liquid crystal layer 260 disposed between the first transparent conductive element 220 and the second transparent conductive element 250. A pitch of the first cholesteric liquid crystal layer 260 may be determined according to a wavelength intended to be reflected by the decoration panel 200, which should however not be construed as a limitation in the disclosure.

With reference to FIG. 1 and FIG. 2, the display apparatus 10 is capable of switching between a display mode and a decoration mode. When the display apparatus 10 is in the decoration mode, the decoration panel 200 is not enabled (i.e., a potential difference between the first transparent conductive element 220 and the second transparent conductive element 250 is substantially zero), the first cholesteric liquid crystal layer 260 is in a reflective mode (or a planar mode), and the display apparatus 10 renders the decoration pattern PT. Specifically, the decoration pattern PT presented by the display apparatus 10 corresponds to the transparent structure 230 of the decoration panel 200. In this embodiment, the decoration pattern PT and the transparent structure 230 are substantially overlapped. That is, in a top view of the display apparatus 10, the decoration pattern PT is substantially aligned with the position of the transparent structure 230. The mechanism of rendering the decoration pattern PT by the display apparatus 10 is explained below with reference to FIG. 1, FIG. 2, and FIG. 3.

Figure 3:
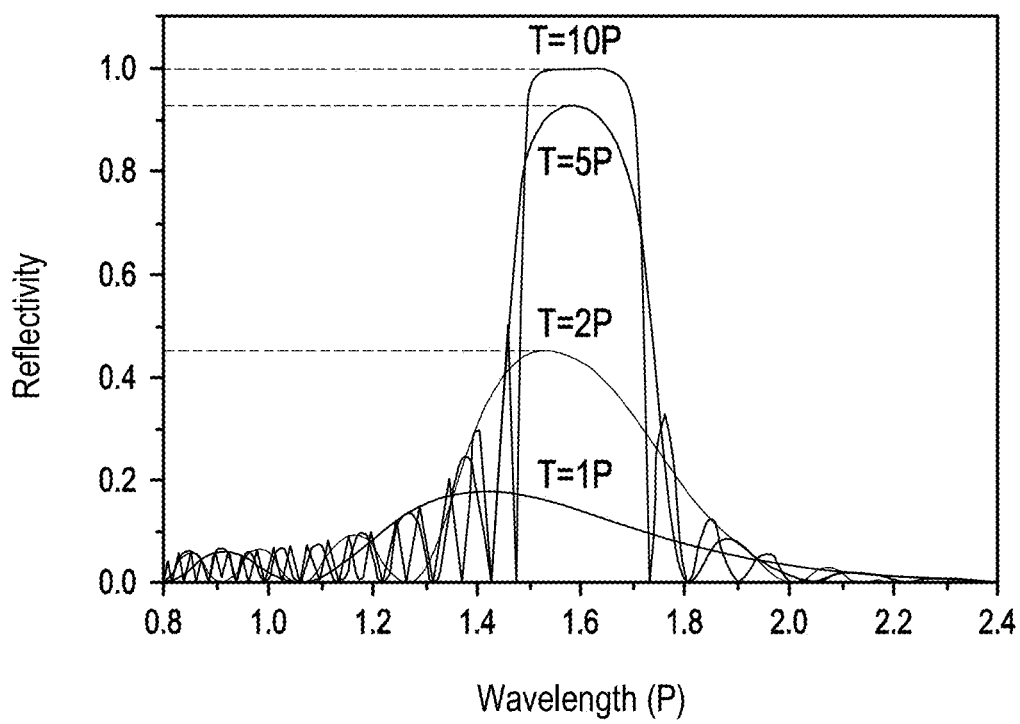
FIG. 3 illustrates a relationship between a wavelength of incident light and a reflectivity of a first cholesteric liquid crystal layer of various thicknesses.

FIG. 3 illustrates a relationship between a wavelength of incident light and a reflectivity of a first cholesteric liquid crystal layer of various thicknesses. With reference to FIG. 3, P is the pitch of the first cholesteric liquid crystal layer. For instance, if the wavelength of the incident light is equal to 1.6 P (e.g., 750 nm), the more multiples of the pitch P a thickness T of the first cholesteric liquid crystal layer is (or in other words, the thicker the first cholesteric liquid crystal layer is), the higher the reflectivity of the first cholesteric liquid crystal layer.

With reference to FIG. 1, a first region 200a of the decoration panel 200 does not include the transparent structure 230, while a second region 200b of the decoration panel 200 includes the transparent structure 230. A thickness T1 of the first cholesteric liquid crystal layer 260 in the first region 200a is greater than a thickness T2 of the first cholesteric liquid crystal layer 260 in the second region 200b. When the display apparatus 10 is in the decoration ode, the decoration panel 200 is not enabled, and the first cholesteric liquid crystal layer 260 is in a reflective mode. At this time, a reflectivity of the first region 200a is higher and tends to present the color that the decoration panel 200 intends to reflect, while a reflectivity of the second region 200b is lower (i.e., the transmittance is greater) and tends to present the color of the display panel 100 behind the decoration panel 200. As such, the decoration panel 200 may render the decoration pattern PT (drawn in FIG. 2).

For instance, in this embodiment, the color to be reflected by the decoration panel 200 may be a reddish-yellow color similar to the color of wood; when the display apparatus 10 is in the decoration mode, the display panel 100 may optionally not be enabled and may present a black color. When the display apparatus 10 switches to the decoration mode, the first region 200a of the decoration panel 200 tends to present the reddish-yellow color similar to the color of wood, while the second region 200b of the decoration panel 200 tends to present the black color of the disabled display panel 100. That is, the first region 200a of the decoration panel 200 corresponds to a wooden region PTa of the decoration pattern PT, the second region 200b of the decoration panel 200 corresponds to a wood grain region PTb of the decoration pattern PT, and the entire decoration pattern PT presents a cross-section of crude wood. However, the disclosure is not limited to what is described above, and in other embodiments, by changing the pattern and/or the height of the transparent structure 230, the decoration pattern PT may also be another type of pattern.

In this embodiment, the first cholesteric liquid crystal layer 260 has a pitch, a direction z is perpendicular to the first substrate 210, the first transparent conductive element 220 and the second transparent conductive element 250 are spaced from each other by a maximum distance d in the direction z, the maximum distance d is a liquid crystal gap of the decoration panel 200, and a ratio of the maximum distance d to the pitch of the first cholesteric liquid crystal layer 260 may fall within the range of 2 to 15, so as to ensure the high reflectivity of the first region 200a of the decoration panel 200 and further provide the decoration pattern PT achieving favorable visual effects. The ratio of the maximum distance d to the pitch of the first cholesteric liquid crystal layer 260 is preferably within the range of 5 to 10, which should however not be construed as a limitation in the disclosure.

In this embodiment, the first transparent conductive element 220 and the second transparent conductive element 250 are spaced from each other by the maximum distance d in the z direction, the maximum distance d is the liquid crystal gap of the decoration panel 200, the transparent structure 230 has a height H in the z direction, and the maximum distance d and the height H may satisfy:

$$0 \leq \frac{(d-H)}{d} < 1,$$

so as to significantly differentiate the reflectivity of the first region 200a from the reflectivity of the second region 200b of the decoration panel 200, and thereby the decoration pattern PT becomes more apparent.

In this embodiment, to achieve a multi-layered decoration pattern PT, the transparent structure 230 may be designed to optionally include a first portion 232 and a second portion 234 of different heights. A height H1 of the first portion 232 of the transparent structure 230 is greater than a height H2 of the second portion 234 of the transparent structure 230.

The second region 200b of the decoration panel 200 includes a first sub-region 200b-1 and a second sub-region 200b-2. The first sub-region 200b-1 of the second region 200b of the decoration panel 200 includes a first portion 232 of the transparent structure 230 of a greater height. The second sub-region 200b-2 of the second region 200b of the decoration panel 200 includes a second portion 234 of the transparent structure 230 of a lower height. A thickness T2-1 of the first cholesteric liquid crystal layer 260 in the first sub-region 200b-1 of the second region 200b is less than a thickness T2-2 of the first cholesteric liquid crystal layer 260 in the second sub-region 200b-2 of the second region 200b. When the decoration panel 200 is not enabled, and the first cholesteric liquid crystal layer 260 is in a reflective mode, a reflectivity of the first sub-region 200b-1 is lower than a reflectivity of the second sub-region 200b-2. In other words, a transmittance of the first sub-region 200b-1 is higher than a transmittance of the second sub-region 200b-2, thus resulting in a more diverse color spectrum being manifested in the first sub-region 200b-1 as compared to the second sub-region 200b-2. Consequently, in this embodiment, the decoration panel 200 may generate a wood grain pattern corresponding to the first sub-region 200b-1 with a deeper hue and a wood grain pattern corresponding to the second sub-region 200b-2 with a lighter shade, thereby enhancing the layered appearance of the decoration pattern PT.

With reference to FIG. 1 and FIG. 3, for instance, in this embodiment, the pitch of the first cholesteric liquid crystal layer 260 is 0.47 μm, the maximum distance d (i.e., the liquid crystal gap of the decoration panel 200) between the first transparent conductive element 220 and the second transparent conductive element 250 may be 4.7 μm (i.e., 10 times the pitch), the reflectivity of the first region 200a is 1, and the first region 200a corresponds to the wooden region PTa of the decoration pattern PT; the height H2 of the second portion 234 of the transparent structure 230 may be 2.35 μm, the thickness T2-2 of the first cholesteric liquid crystal layer 260 in the second sub-region 200b-2 may be 2.35 μm (i.e., 5 times the pitch), the reflectivity of the second sub-region 200b-2 is 92%, and the second sub-region 200b-2 corresponds to the lighter wood grain region PTb-2 of the decoration pattern PT; the height H1 of the first portion 232 of the transparent structure 230 may be 3.76 μm, the thickness T2-1 of the first cholesteric liquid crystal layer 260 in the first sub-region 200b-1 may be 0.94 μm (i.e., 2 times the pitch), the reflectivity of the first sub-region 200b-1 may be 42%, and the first sub-region 200b-1 corresponds to the darker wood grain region PTb-2 of the decoration pattern PT. The above numeric values serve to exemplify the invention in the disclosure, which should however not be construed as a limitation in the disclosure.

With reference to FIG. 1, on the other hand, in addition to being able to switch to the decoration mode, the display apparatus 10 may also switch to the display mode. When the display apparatus 10 is in the display mode, the decoration panel 200 is enabled (i.e., the potential difference between the first transparent conductive element 220 and the second transparent conductive element 250 is substantially greater than 0), and the first cholesteric liquid crystal layer 260 is in a transmissive mode. At this time, a display light beam emitted by the display panel 100 passes through the decoration panel 200 and conveys the display information it carries to the eyes of users. In this embodiment, the transmissive mode may refer to a focal conic mode or a homeotropic mode, which should however not be construed as a limitation in the disclosure.

It is worth noting that the incorporation of the decoration panel 200, featuring the transparent structure 230, equips the display apparatus 10 with the capability of not only rendering the decoration pattern PT in the decoration mode but also displaying user-selected display information on the display panel 100 in the display mode without displaying the decoration pattern PT. Alternatively, the display apparatus 10 may display both the display information and the decoration pattern PT simultaneously. That is, the inclusion of the switchable decoration panel 200 significantly enhances the versatility and diversity of display effects achievable by the display apparatus 10.

To fully illustrate various embodiments of the disclosure, other embodiments of the disclosure will be described below. It should be noted that the reference numbers and some content of the previous embodiments are used in the following embodiments, where the same reference numbers serve to represent the same or similar components, and the description of the same technical content is omitted. For the description of the omitted parts, please refer to the previous embodiments, and the description of the omitted parts will not be redundantly repeated in the following embodiments.

Figure 4:
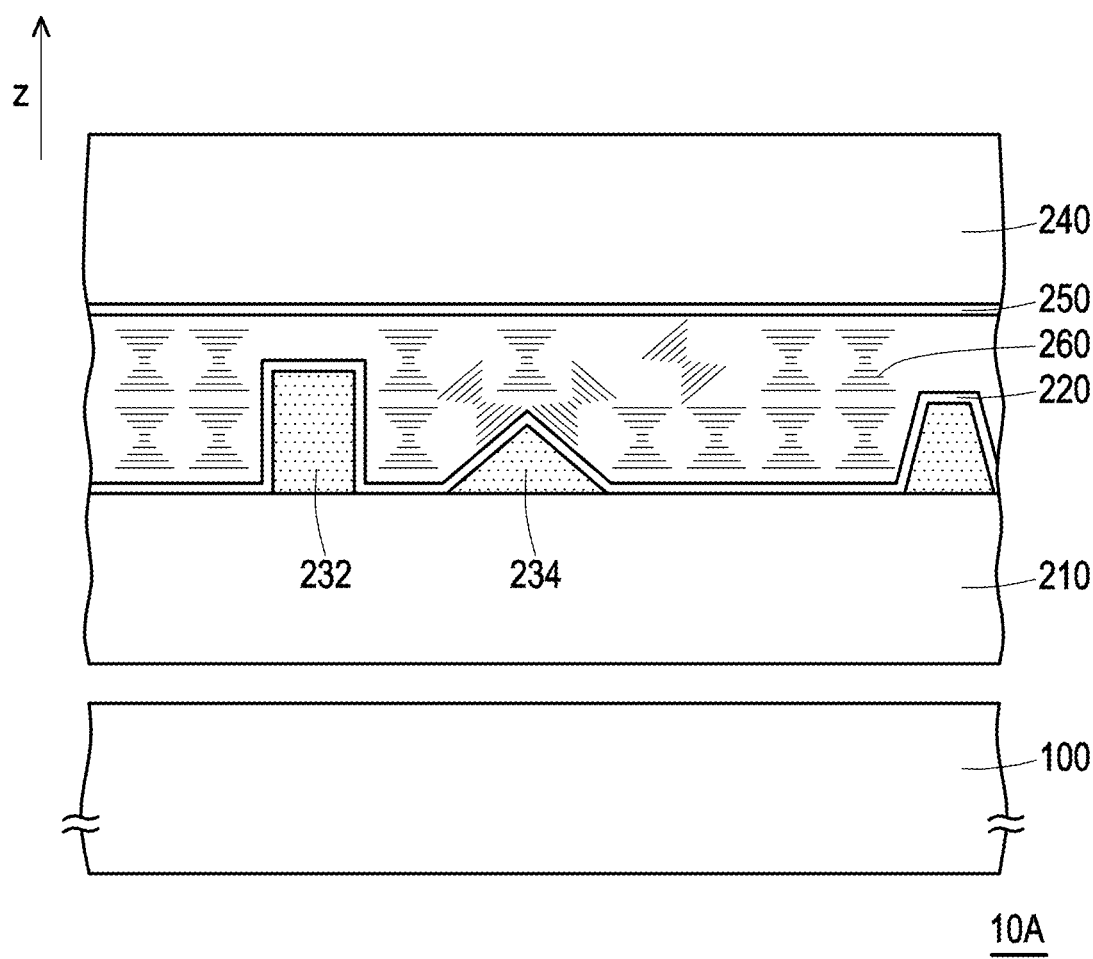
FIG. 4 is a schematic cross-sectional diagram of a display apparatus according to another embodiment of the disclosure.

FIG. 4 is a schematic cross-sectional diagram of a display apparatus according to another embodiment of the disclosure. A display apparatus 10A in FIG. 4 is similar to the display apparatus 10 in FIG. 1, and the difference between the two lies in the different positions of the transparent structure 230 of the decoration panels 200 and 200A. With reference to FIG. 4, specifically, in this embodiment, the transparent structure 230 of the decoration panel 200A is located between the first transparent conductive element 220 and the first substrate 210.

Figure 5:
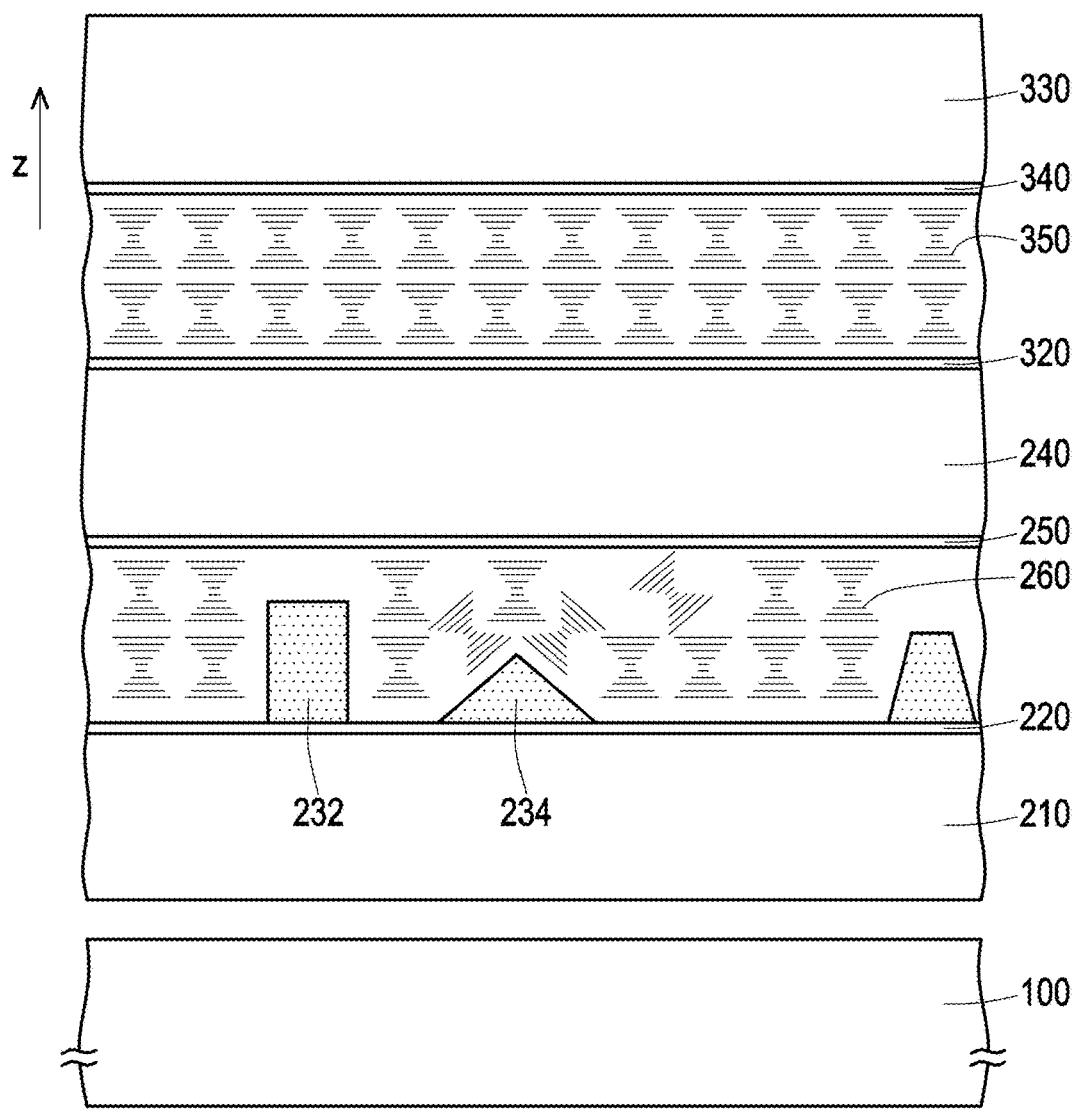
FIG. 5 is a schematic cross-sectional diagram of a display apparatus according to still another embodiment of the disclosure.

FIG. 5 is a schematic cross-sectional diagram of a display apparatus according to still another embodiment of the disclosure. A display apparatus 10B in FIG. 5 is similar to the display apparatus 10 in FIG. 1, and the difference between the two lies in that the display apparatus 10B in FIG. 5 further includes a color adjustment portion 300.

With reference to FIG. 5, the color adjustment portion 300 is disposed in front of the decoration panel 200, and the decoration panel 200 is located between the color adjustment portion 300 and the display panel 100. The color adjustment portion 300 includes a third transparent conductive layer 320, a second cholesteric liquid crystal layer 350, a fourth transparent conductive layer 340, and a third substrate 330. The second substrate 240 is located between the third transparent conductive layer 320 and the second transparent conductive element 250. The third transparent conductive layer 320 is located between the second cholesteric liquid crystal layer 350 and the second substrate 240. The second cholesteric liquid crystal layer 350 is located between the fourth transparent conductive layer 340 and the third transparent conductive layer 320. The fourth transparent conductive layer 340 is located between the third substrate 330 and the second cholesteric liquid crystal layer 350.

Specifically, a pitch of the second cholesteric liquid crystal layer 350 of the color adjustment portion 300 is different from the pitch of the first cholesteric liquid crystal layer 260 of the decoration panel 200. That is, the color adjustment portion 300 and the decoration panel 200 exhibit distinct reflective characteristics and interact with light beams of different wavelength ranges. By blending a first color light beam reflected by the decoration panel 200 with a second color light beam by the color adjustment portion 300, the display apparatus 10B may effectively render the decoration pattern PT in a broader spectrum of colors.

Figure 6:
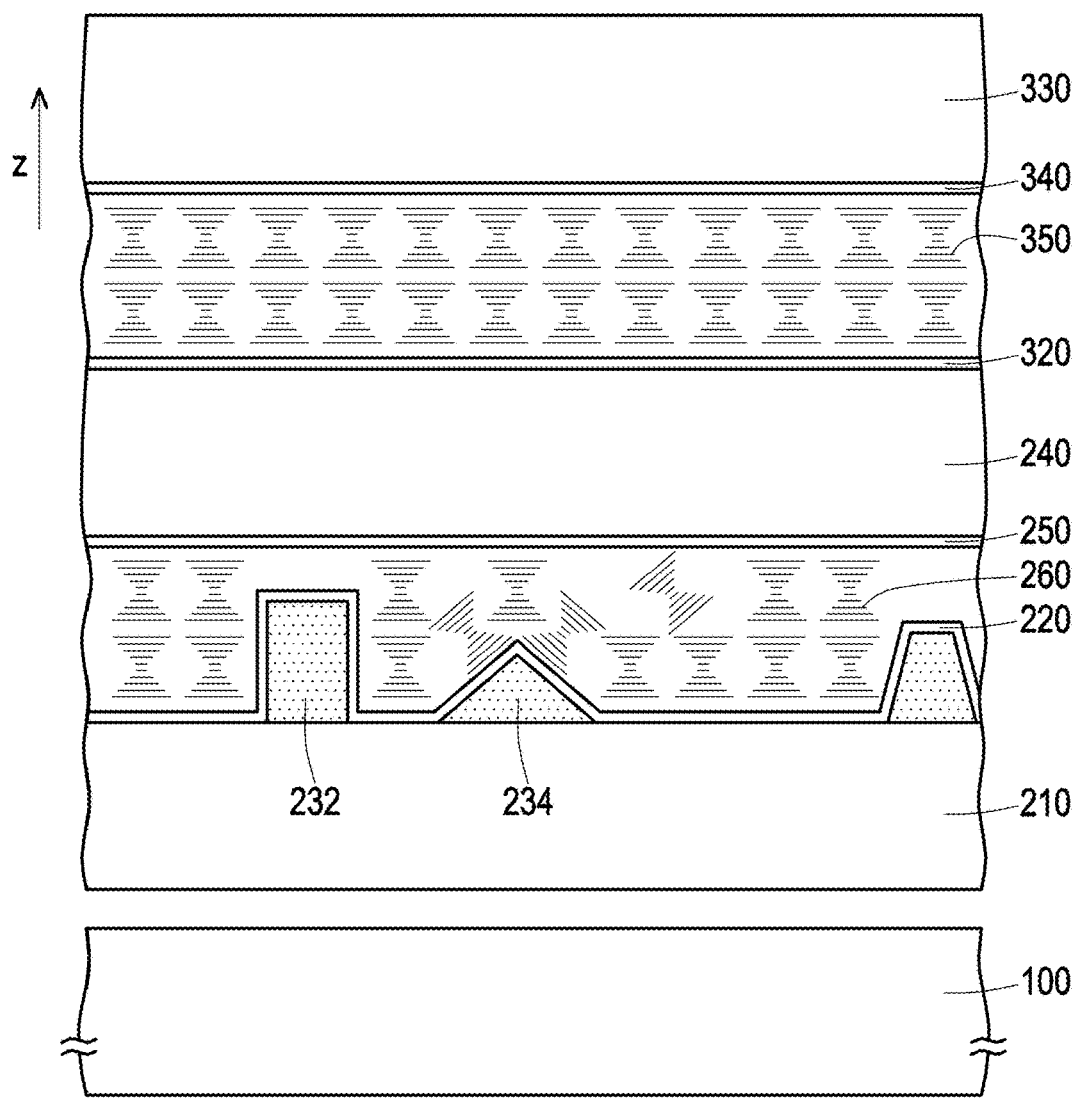
FIG. 6 is a schematic cross-sectional diagram of a display apparatus according to yet another embodiment of the disclosure.

FIG. 6 is a schematic cross-sectional diagram of a display apparatus according to yet another embodiment of the disclosure. A display apparatus 10C in FIG. 6 is similar to the display apparatus 10A in FIG. 4, and the difference between the two lies in that the display apparatus 10C in FIG. 6 further includes the color adjustment portion 300. The color adjustment portion 300 in FIG. 6 is the same as the color adjustment portion 300 in FIG. 5 and thus will not be further elaborated.

Figure 7:
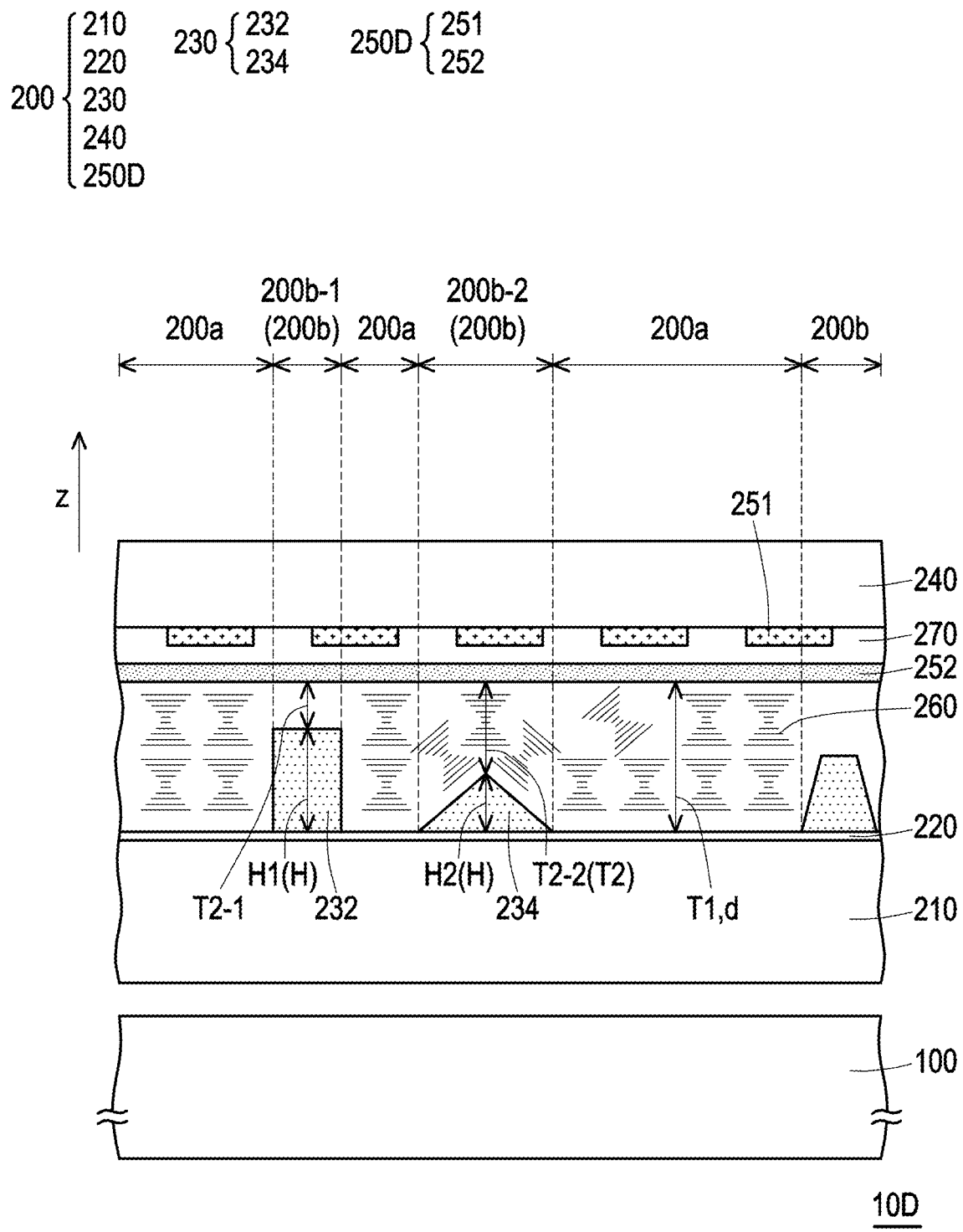
FIG. 7 is a schematic cross-sectional diagram of a display apparatus according to an embodiment of the disclosure.
Figure 8:
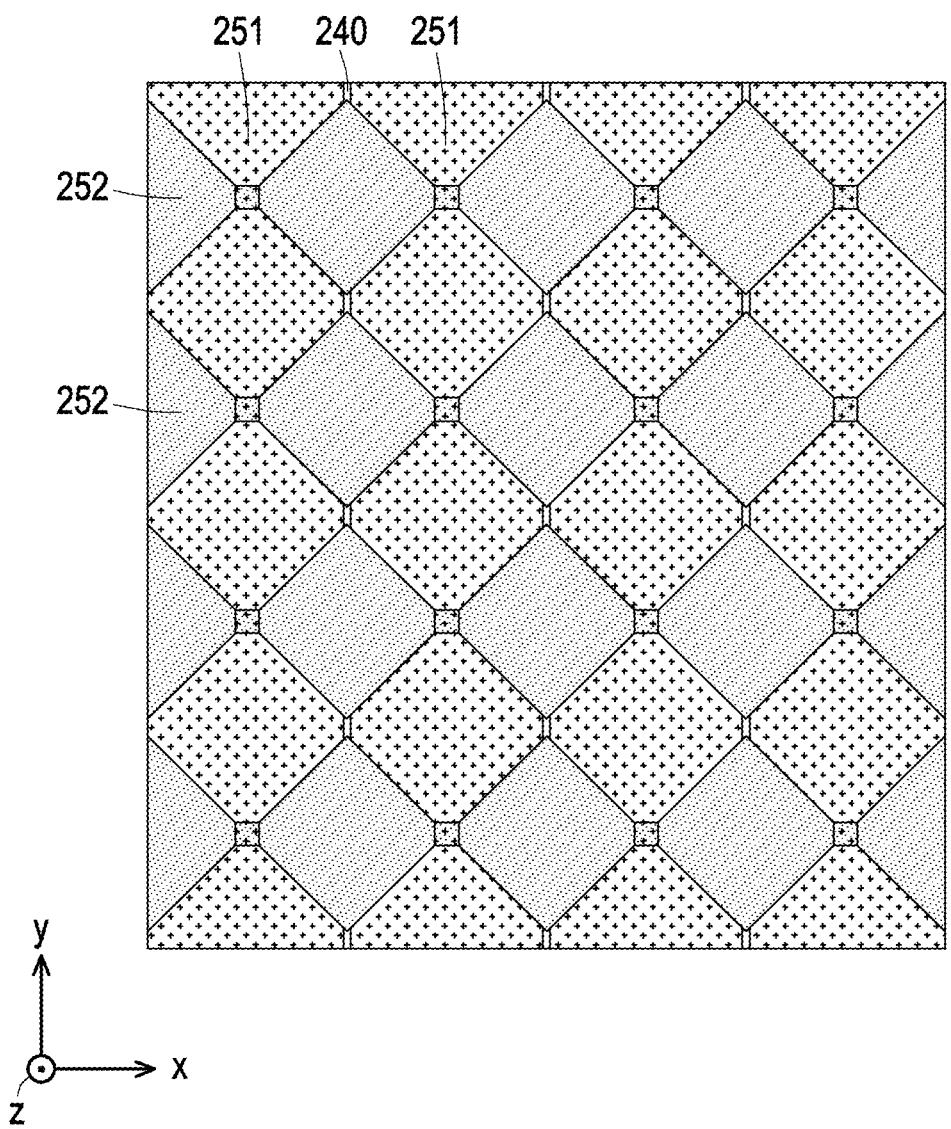
FIG. 8 is a schematic top and perspective diagram of a second substrate, a plurality of first touch-sensing electrodes, and a plurality of second touch-sensing electrodes of a display apparatus according to an embodiment of the disclosure.
Figure 9:
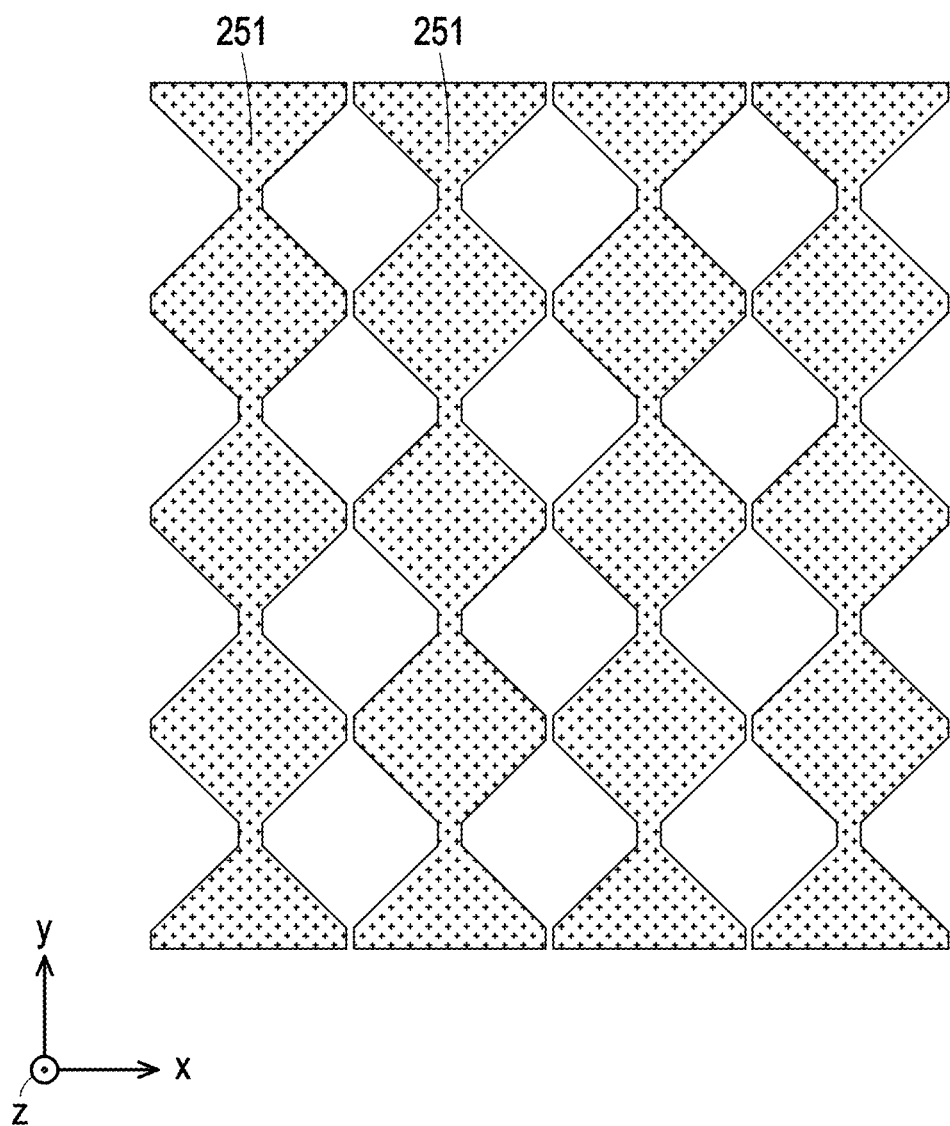
FIG. 9 is a schematic top and perspective diagram of a plurality of first touch-sensing electrodes of a display apparatus according to an embodiment of the disclosure.
Figure 10:
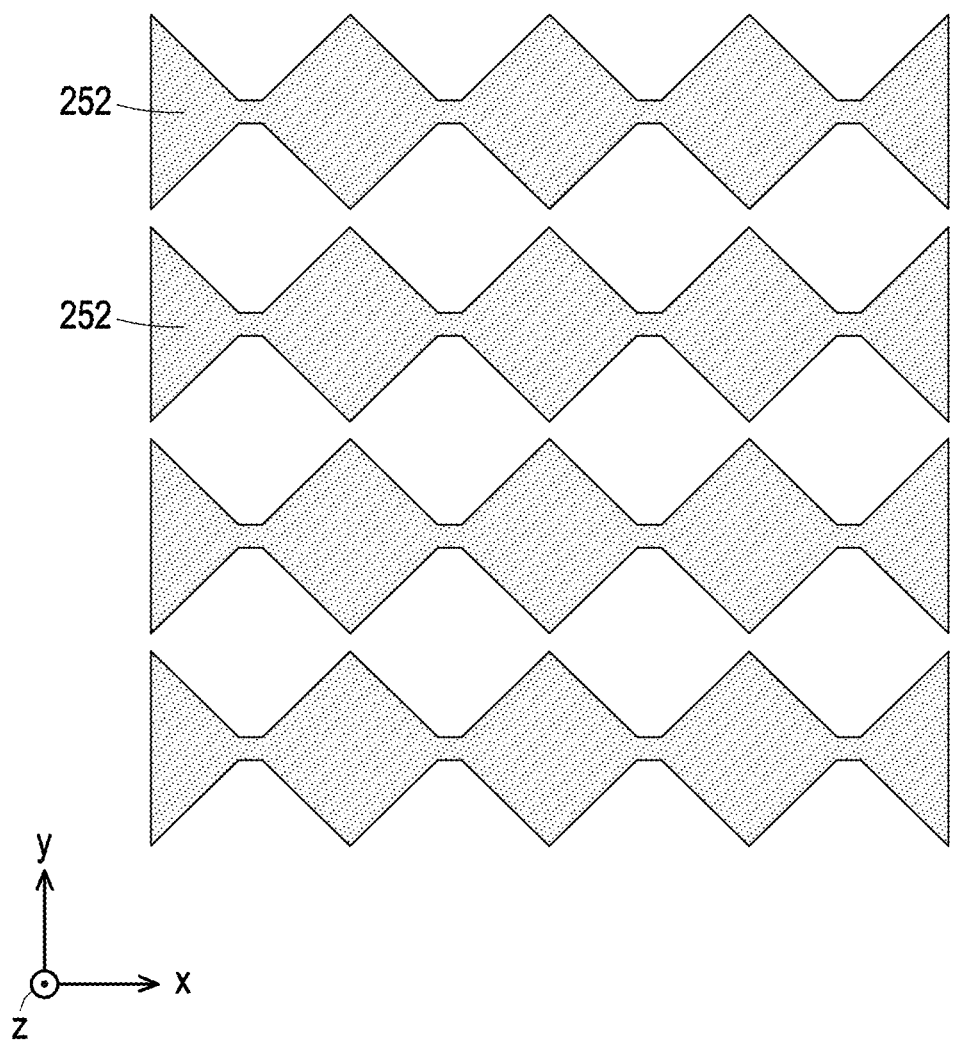
FIG. 10 is a schematic top and perspective diagram of a plurality of second touch-sensing electrodes of a display apparatus according to an embodiment of the disclosure.

FIG. 7 is a schematic cross-sectional diagram of a display apparatus according to an embodiment of the disclosure. FIG. 8 is a schematic top and perspective diagram of a second substrate, a plurality of first touch-sensing electrodes, and a plurality of second touch-sensing electrodes of a display apparatus according to an embodiment of the disclosure. FIG. 9 is a schematic top and perspective diagram of a plurality of first touch-sensing electrodes of a display apparatus according to an embodiment of the disclosure. FIG. 10 is a schematic top and perspective diagram of a plurality of second touch-sensing electrodes of a display apparatus according to an embodiment of the disclosure.

A display apparatus 10D in FIG. 7 is similar to the display apparatus 10 in FIG. 1, and the difference between the two lies in that a second transparent conductive element 250D of the display apparatus 10D in FIG. 7 is different from the second transparent conductive element 250 of the display apparatus 10 in FIG. 1. In addition to acting as an upper electrode for driving the first cholesteric liquid crystal layer 260, the second transparent conductive element 250D, as depicted in FIG. 7, is equipped with touch-sensing capabilities.

With reference to FIG. 7, FIG. 8, FIG. 9, and FIG. 10, specifically, in this embodiment, the second transparent conductive element 250D is located between the second substrate 240 and the first cholesteric liquid crystal layer 260. The second transparent conductive element 250D includes a plurality of first touch-sensing electrodes 251 and a plurality of second touch-sensing electrodes 252. The first touch-sensing electrodes 251 are structurally separated from each other, the second touch-sensing electrodes 252 are structurally separated from each other, and the first touch-sensing electrodes 251 and the second touch-sensing electrodes 252 are alternately arranged. The first touch-sensing electrodes 251 are arranged in an x direction, and the second touch-sensing electrodes 252 are arranged in a y direction, where the x direction and the y direction are alternately arranged and perpendicular to the first substrate 210.

In this embodiment, the first touch-sensing electrodes 251 are located between the second substrate 240 and the second touch-sensing electrodes 252. The first touch-sensing electrodes 251 may be receiving electrodes (Rx), and the second touch-sensing electrodes 252 may be transmitting electrodes (Tx), which should however not be construed as a limitation in the disclosure. In this embodiment, materials of the first touch-sensing electrodes 251 and the second touch-sensing electrodes 252 may optionally include metal oxides, such as ITO, IZO, ATO, AZO, IGZO, any other appropriate oxide, or a stacked layer containing at least two of the above-mentioned materials, which should however not be construed as a limitation in the disclosure.

In this embodiment, the display apparatus 10D may further include a first insulation layer 270 disposed between the first touch-sensing electrodes 251 and the second touch-sensing electrodes 252 to electrically isolate the first touch-sensing electrodes 251 from the second touch-sensing electrodes 252. In this embodiment, alternatively, the first insulation layer 270 may entirely cover the first touch-sensing electrodes 251 and the second substrate 240, which should however not be construed as a limitation in the disclosure.

Figure 11:
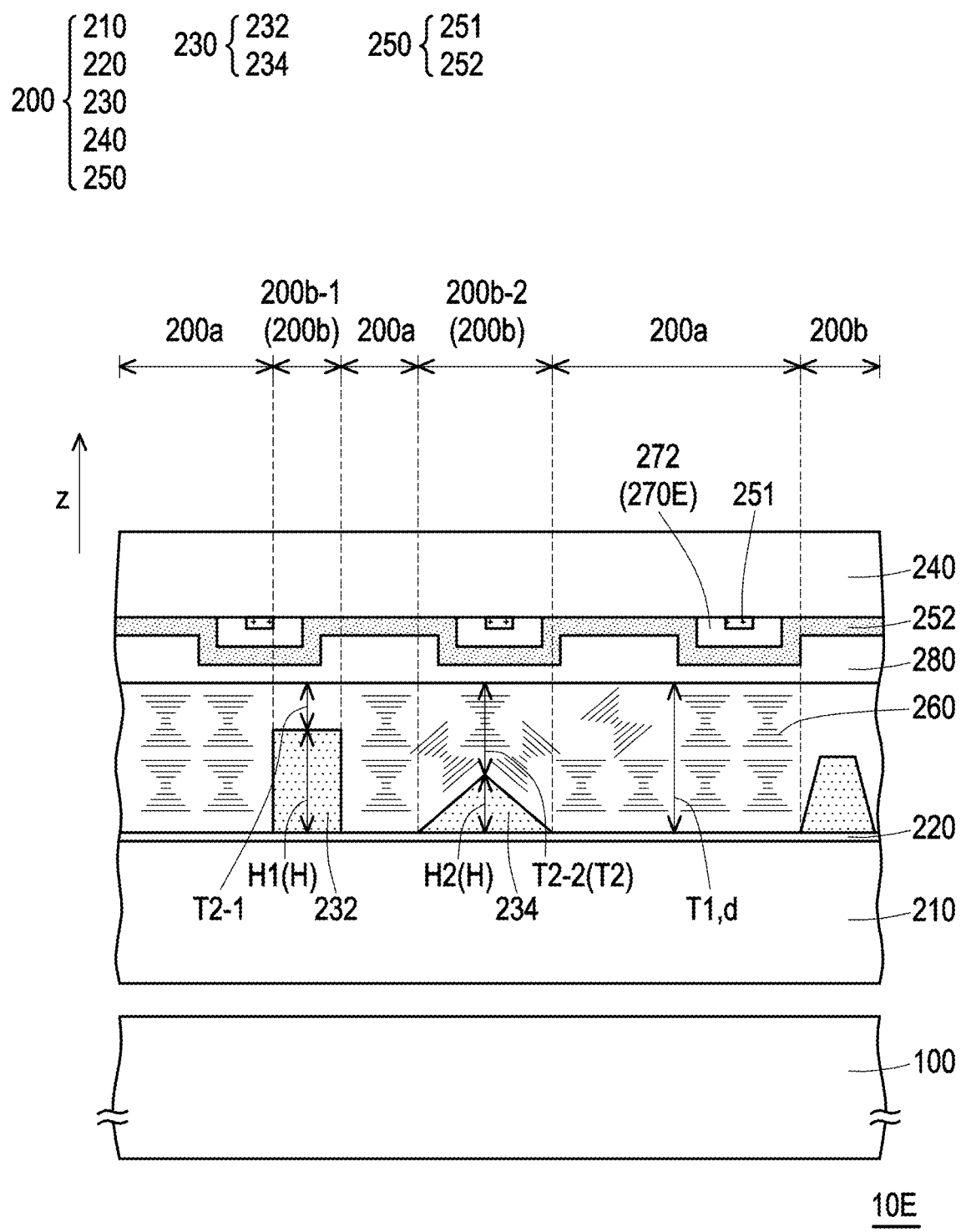
FIG. 11 is a schematic cross-sectional diagram of a display apparatus according to another embodiment of the disclosure.

FIG. 11 is a schematic cross-sectional diagram of a display apparatus according to another embodiment of the disclosure. A display apparatus 10E in FIG. 11 is similar to the display apparatus 10D in FIG. 7, and the difference between the two lies in that a first insulation layer 270E of the display apparatus 10E in FIG. 11 is different from the first insulation layer 270 of the display apparatus 10D in FIG. 7. With reference to FIG. 11, specifically, in this embodiment, the first insulation layer 270E includes a plurality of island-shaped insulation patterns 272, which are respectively disposed at a plurality of intersections between the first touch-sensing electrodes 251 and the second touch-sensing electrodes 252.

Figure 12:
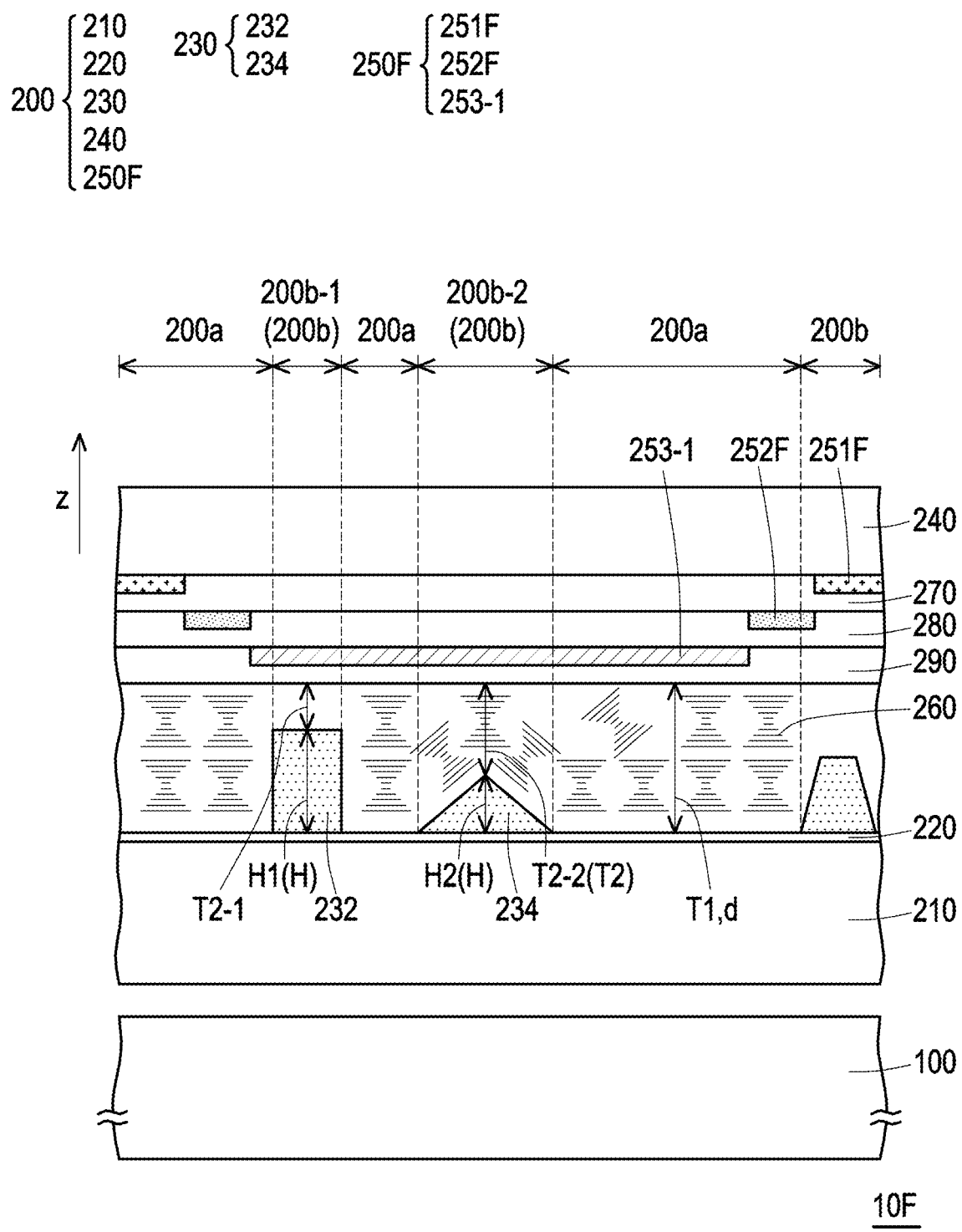
FIG. 12 is a schematic cross-sectional diagram of a display apparatus according to still another embodiment of the disclosure.
Figure 13:
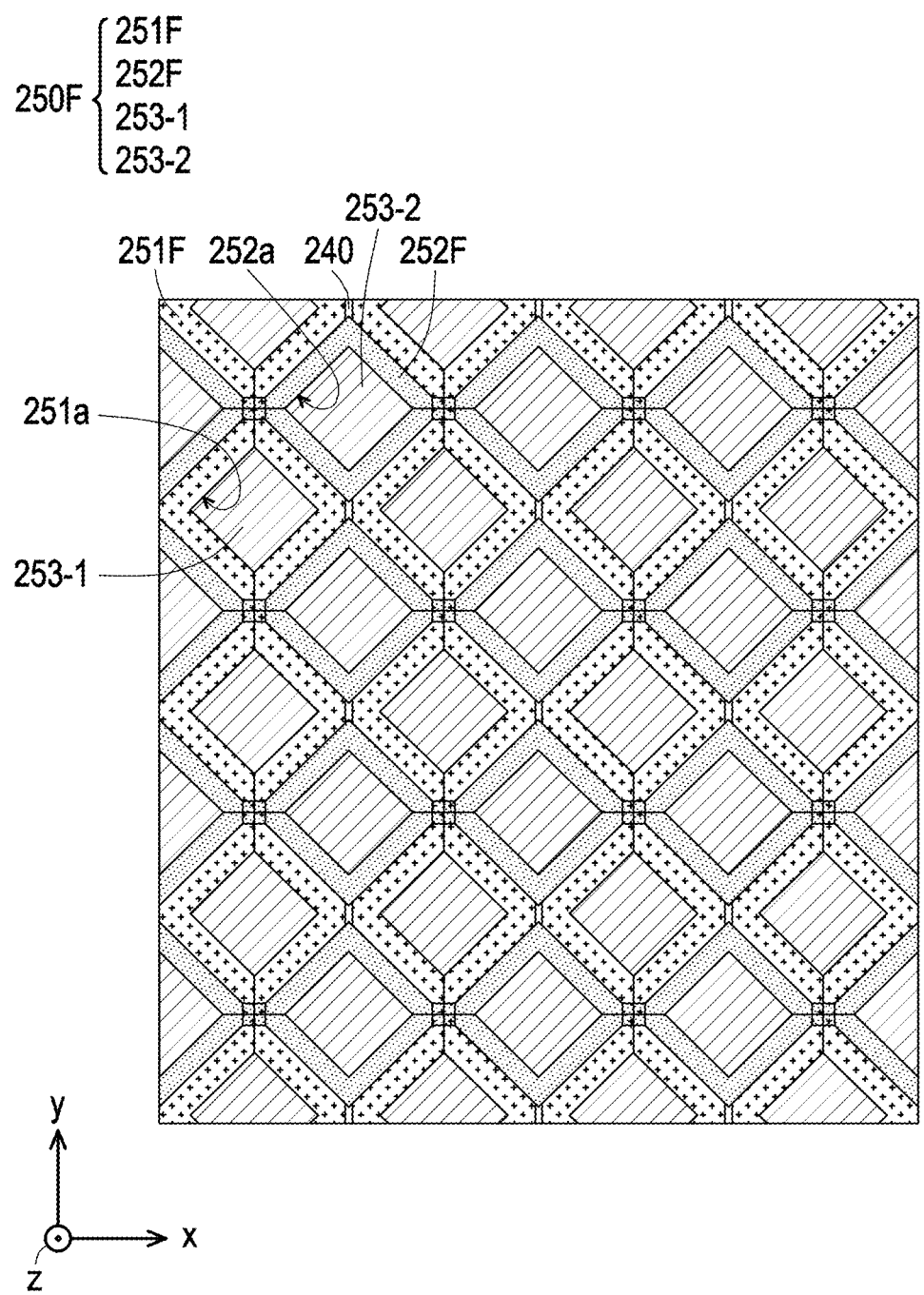
FIG. 13 is a schematic top and perspective diagram of a second substrate, a plurality of first touch-sensing electrodes, a plurality of second touch-sensing electrodes, a plurality of first dummy electrodes, and a plurality of second dummy electrodes of the display apparatus according to still another embodiment of the disclosure.
Figure 14:
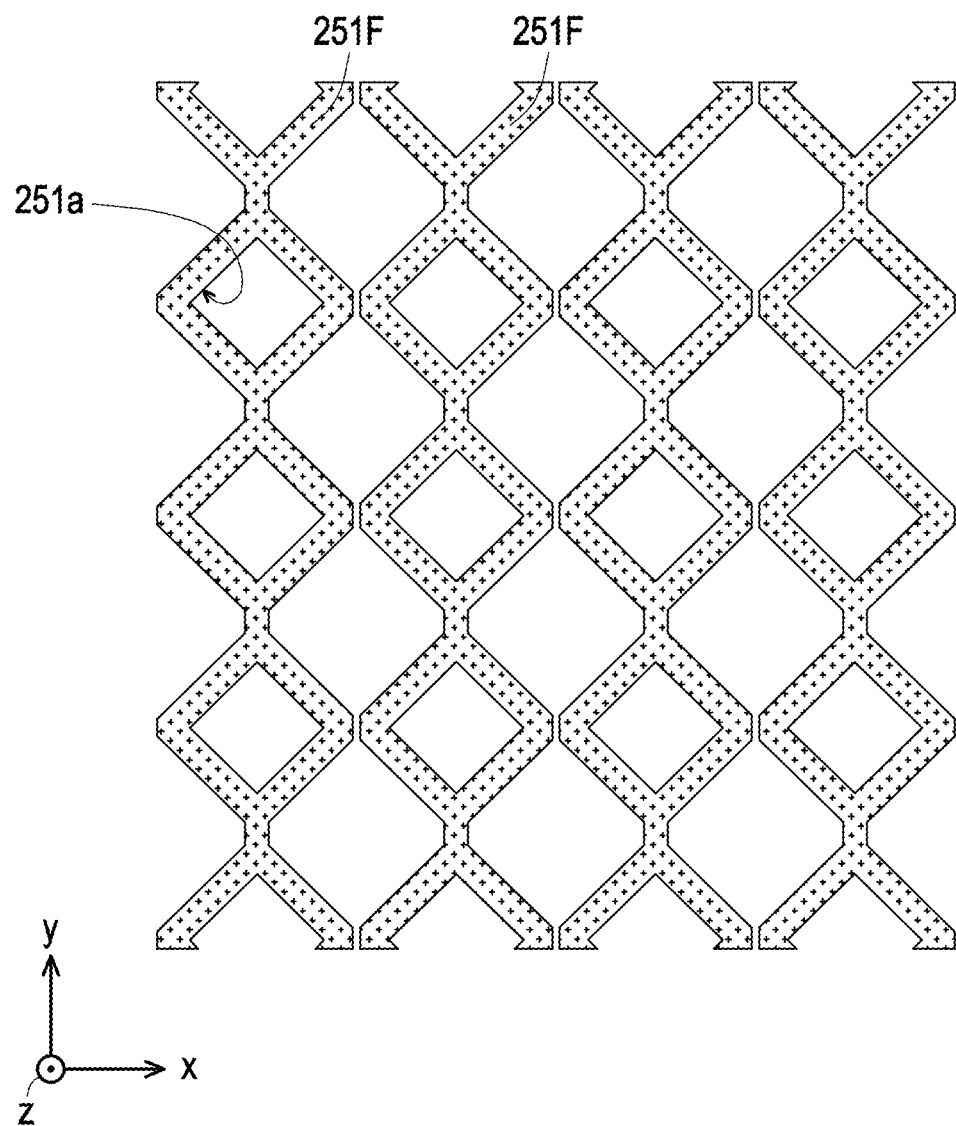
FIG. 14 is a schematic top and perspective diagram of a plurality of first touch-sensing electrodes of a display apparatus according to still another embodiment of the disclosure.
Figure 15:
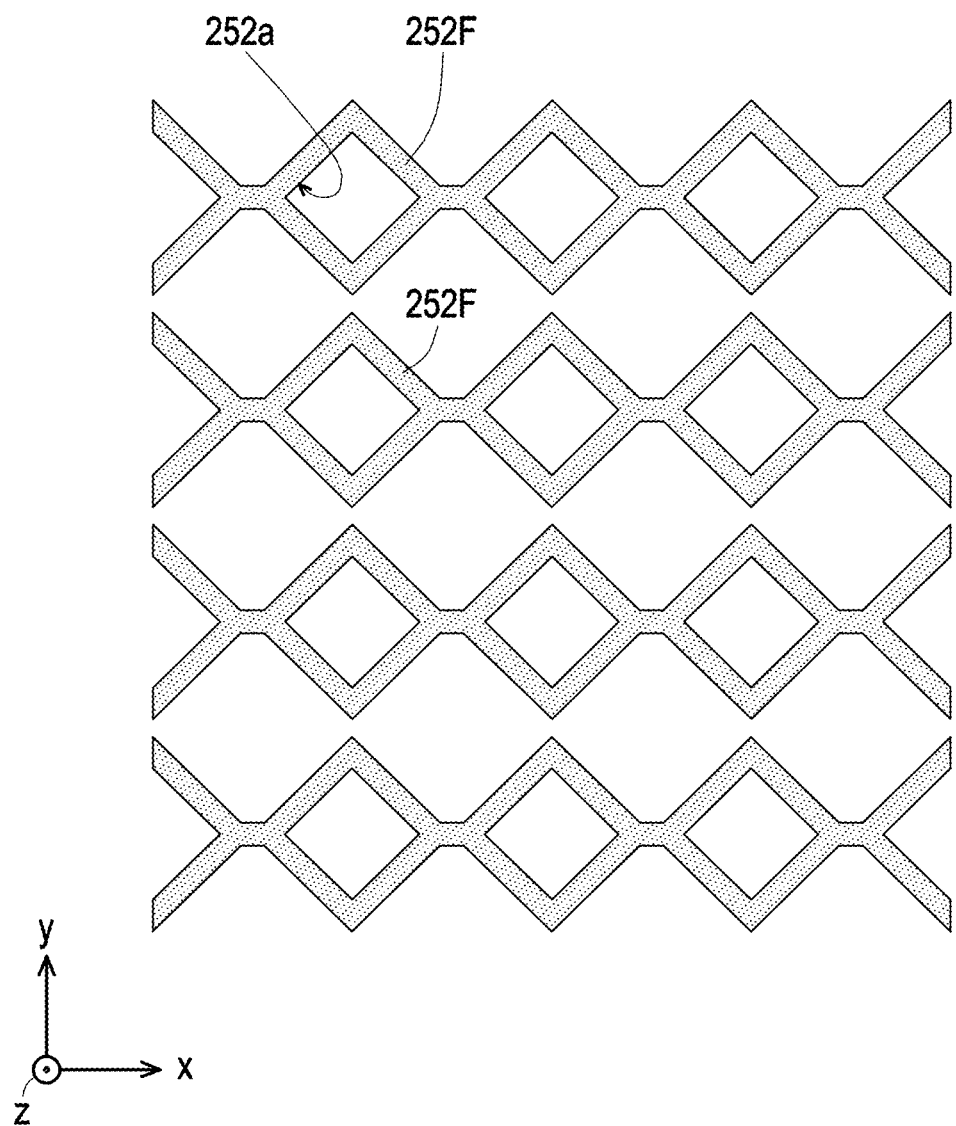
FIG. 15 is a schematic top and perspective diagram of a plurality of second touch-sensing electrodes of a display apparatus according to still another embodiment of the disclosure.
Figure 16:
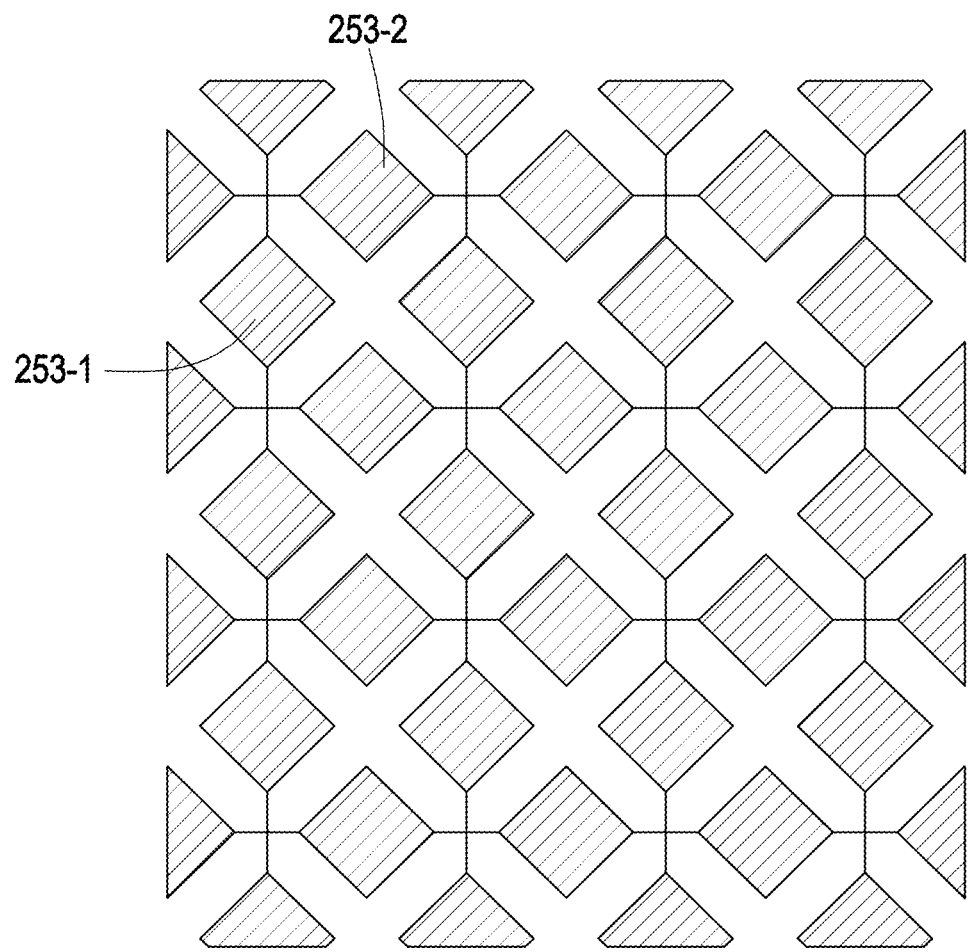
FIG. 16 is a schematic top and perspective diagram of a plurality of first dummy electrodes and a plurality of second dummy electrodes of a display apparatus according to still another embodiment of the disclosure.

FIG. 12 is a schematic cross-sectional diagram of a display apparatus according to still another embodiment of the disclosure. FIG. 13 is a schematic top and perspective diagram of a second substrate, a plurality of first touch-sensing electrodes, a plurality of second touch-sensing electrodes, a plurality of first dummy electrodes, and a plurality of second dummy electrodes of the display apparatus according to still another embodiment of the disclosure. FIG. 14 is a schematic top and perspective diagram of a plurality of first touch-sensing electrodes of a display apparatus according to still another embodiment of the disclosure. FIG. 15 is a schematic top and perspective diagram of a plurality of second touch-sensing electrodes of a display apparatus according to still another embodiment of the disclosure. FIG. 16 is a schematic top and perspective diagram of a plurality of first dummy electrodes and a plurality of second dummy electrodes of a display apparatus according to still another embodiment of the disclosure.

A display apparatus 10F in FIG. 12 is similar to the display apparatus 10D in FIG. 7, and the difference between the two lies in that the shape of first touch-sensing electrodes 251F and the shape of second touch-sensing electrodes 252F in the display apparatus 10F in FIG. 12 are different from the shape of the first touch-sensing electrodes 251 and the shape of the second touch-sensing electrodes 252 in the display apparatus 10D in FIG. 7, and a second transparent conductive element 250F of the display apparatus 10F further includes first dummy electrodes 253-1 and second dummy electrodes 253-2.

With reference to FIG. 12, FIG. 13, FIG. 14, FIG. 15, and FIG. 16, in this embodiment, the first touch-sensing electrodes 251F have a plurality of first openings 251a, the second touch-sensing electrodes 252F have a plurality of second openings 252a, the second transparent conductive element 250F further includes the first dummy electrodes 253-1 and the second dummy electrodes 253-2, the first dummy electrodes 253-1 are respectively overlapped with the first openings 251a of the first touch-sensing electrodes 251F, the second dummy electrodes 253-2 are respectively overlapped with the second openings 252a of the second touch-sensing electrodes 252F, the first dummy electrodes 253-1 and the second dummy electrodes 253-2 are structurally separated from the first touch-sensing electrodes 251F and the second touch-sensing electrodes 252F, and the first dummy electrodes 253-1 and the second dummy electrodes 253-2 are electrically connected.

In this embodiment, since the first touch-sensing electrodes 251F have the first openings 251a, and the second touch-sensing electrodes 252F have the second openings 252a, a capacitive-resistive load of the first touch-sensing electrodes 251F and the second touch-sensing electrodes 252F is rather insignificant, which is conducive to the enhancement of the touch-sensing function.

In this embodiment, the display apparatus 10F further includes a second insulation layer 280 and a third insulation layer 290. The second insulation layer 280 is disposed between the second touch-sensing electrodes 252F and the first dummy electrodes 253-1 and between the second touch-sensing electrodes 252F and the second dummy electrodes 253-2. The first dummy electrodes 253-1 and the second dummy electrodes 253-2 are disposed between the second insulation layer 280 and the third insulation layer 290. In short, according to this embodiment, the first touch-sensing electrodes 251F, the second touch-sensing electrodes 252F, and the first dummy electrodes 253-1/the second dummy electrodes 253-2 may belong to respective transparent conductive layers, which should however not be construed as a limitation in the disclosure.

Figure 17:
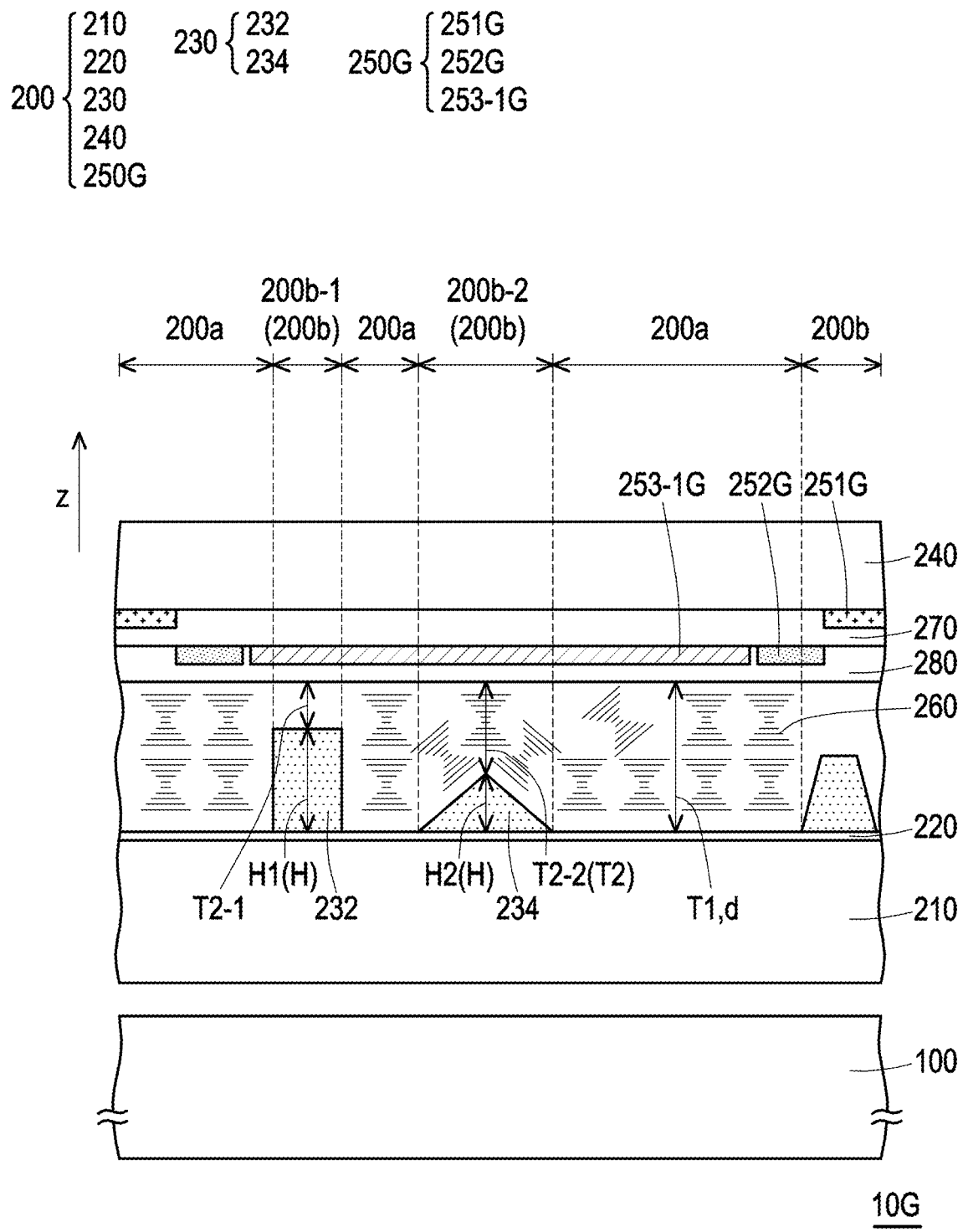
FIG. 17 is a schematic cross-sectional diagram of a display apparatus according to yet another embodiment of the disclosure.
Figure 18:
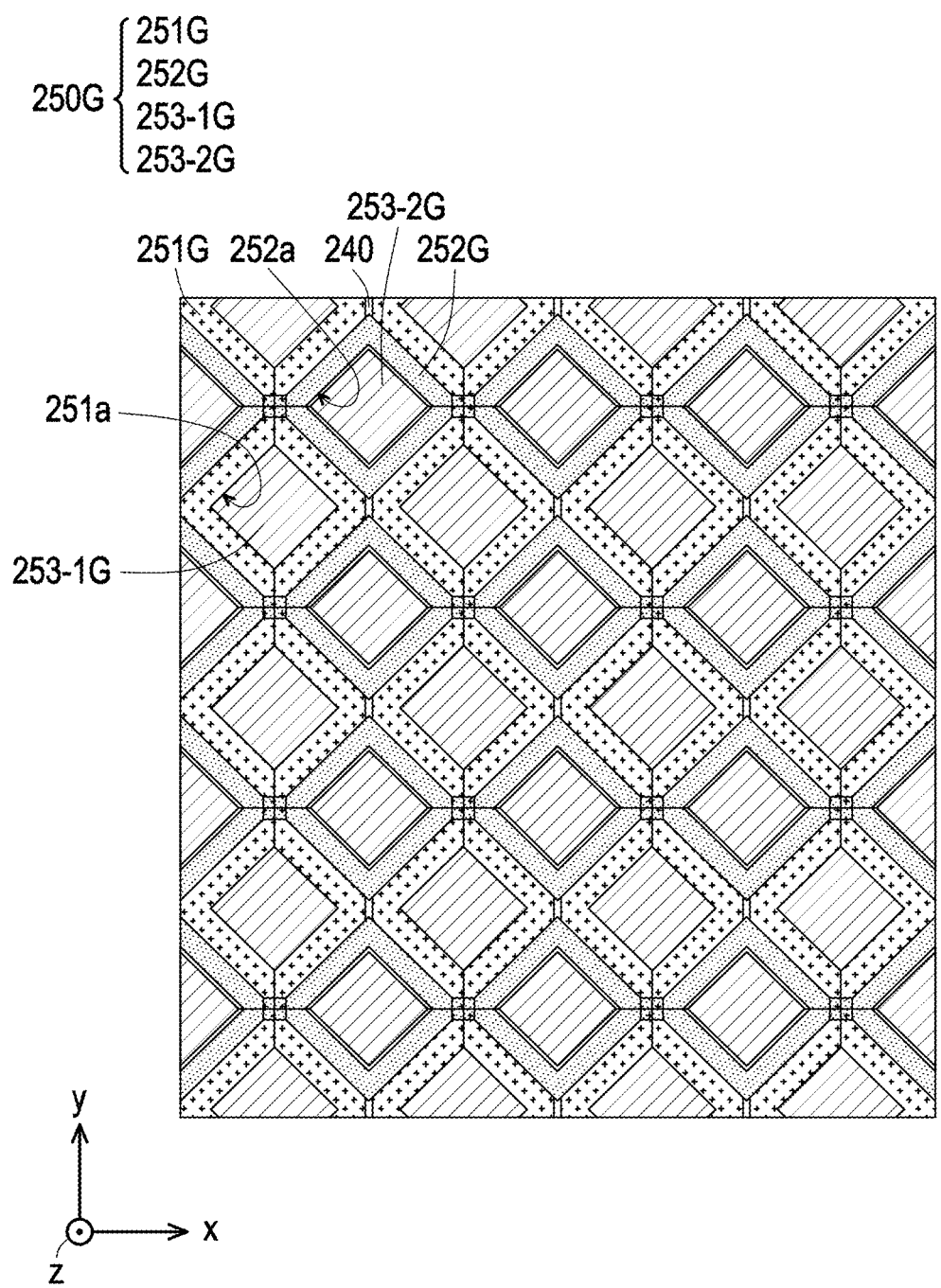
FIG. 18 is a schematic top and perspective diagram of a second substrate, a plurality of first touch-sensing electrodes, a plurality of second touch-sensing electrodes, a plurality of first dummy electrodes, and a plurality of second dummy electrodes of a display apparatus according to yet another embodiment of the disclosure.
Figure 19:
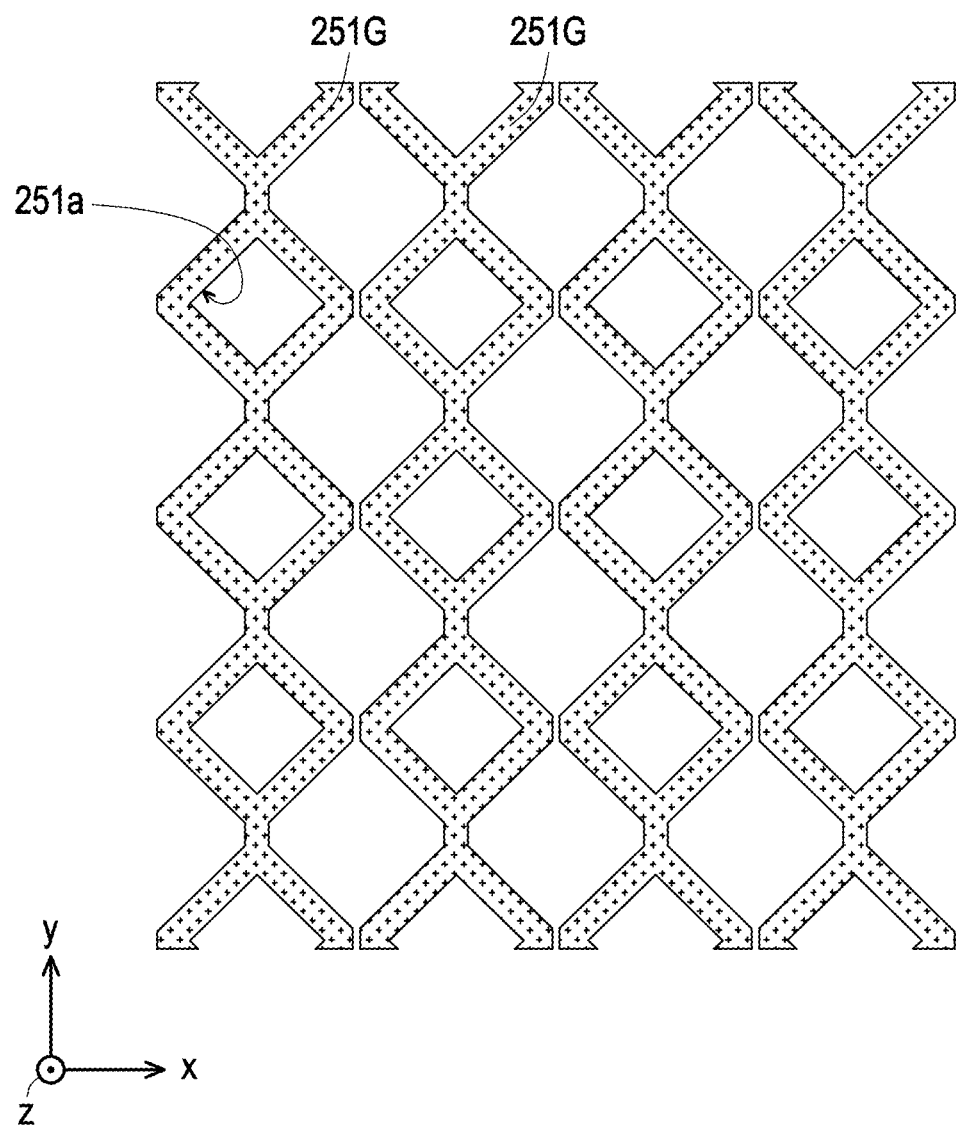
FIG. 19 is a schematic top and perspective diagram of a plurality of first touch-sensing electrodes of a display apparatus according to yet another embodiment of the disclosure.
Figure 20:
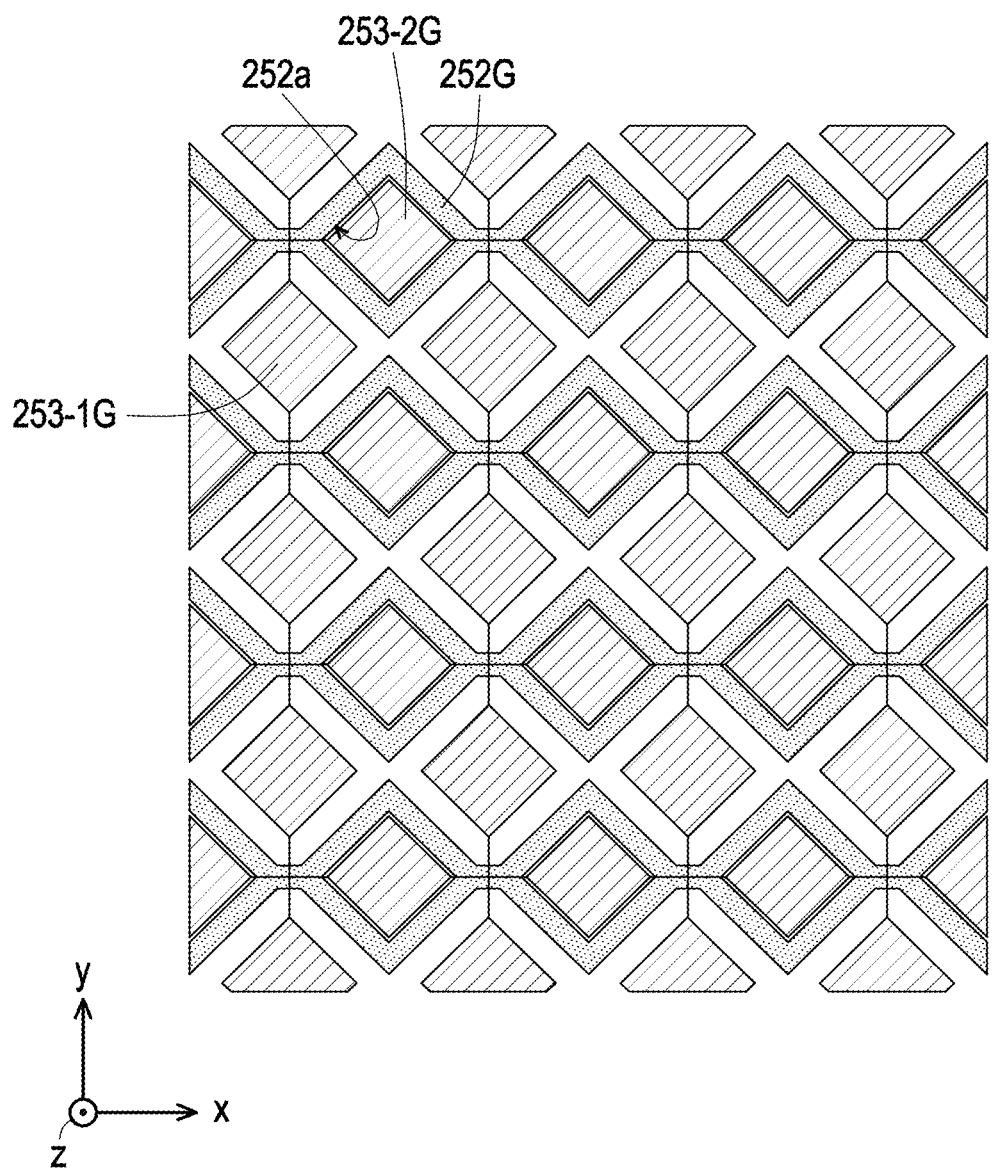
FIG. 20 is a schematic top and perspective diagram of a plurality of second touch-sensing electrodes, a plurality of first dummy electrodes, and a plurality of second dummy electrodes of a display apparatus according to yet another embodiment of the disclosure.

FIG. 17 is a schematic cross-sectional diagram of a display apparatus according to yet another embodiment of the disclosure. FIG. 18 is a schematic top and perspective diagram of a second substrate, a plurality of first touch-sensing electrodes, a plurality of second touch-sensing electrodes, a plurality of first dummy electrodes, and a plurality of second dummy electrodes of a display apparatus according to yet another embodiment of the disclosure. FIG. 19 is a schematic top and perspective diagram of a plurality of first touch-sensing electrodes of a display apparatus according to yet another embodiment of the disclosure. FIG. 20 is a schematic top and perspective diagram of a plurality of second touch-sensing electrodes, a plurality of first dummy electrodes, and a plurality of second dummy electrodes of a display apparatus according to yet another embodiment of the disclosure.

A display apparatus 10G in FIG. 17 is similar to the display apparatus 10F in FIG. 12, and the difference between the two lies in that the film layer relationship among first touch-sensing electrodes 251G, second touch-sensing electrodes 252G, and first dummy electrodes 253-1G/second dummy electrodes 253-2G of the display apparatus 10G in FIG. 17 is not exactly the same as the film layer relationship among the first touch-sensing electrodes 251F, the second touch-sensing electrodes 252F, and the first dummy electrodes 253-1/the second dummy electrodes 253-2 of the display apparatus 10F in FIG. 12.

With reference to FIG. 17, FIG. 18, FIG. 19, and FIG. 20, specifically, in this embodiment, the second transparent conductive element 250G includes the first touch-sensing electrodes 251G, the second touch-sensing electrodes 252G, the first dummy electrodes 253-1G, and the second dummy electrodes 253-2G. The first touch-sensing electrodes 251G are disposed between the second substrate 240 and the first insulation layer 270. The first insulation layer 270 is disposed between the first touch-sensing electrodes 251G and the second touch-sensing electrodes 252G, between the first touch-sensing electrodes 251G and the first dummy electrodes 253-1G, and between the first touch-sensing electrodes 251G and the second dummy electrodes 253-2G. The second touch-sensing electrodes 252G, the first dummy electrodes 253-1G, and the second dummy electrodes 253-2G are disposed between the first insulation layer 270 and the second insulation layer 280. In short, according to this embodiment, the first touch-sensing electrodes 251G and the second touch-sensing electrodes 252G belong to respective transparent conductive layers, and the first dummy electrodes 253-1G, the second dummy electrodes 253-2G, and the second touch-sensing electrodes 252G belong to the same transparent conductive layer.

Figure 21:
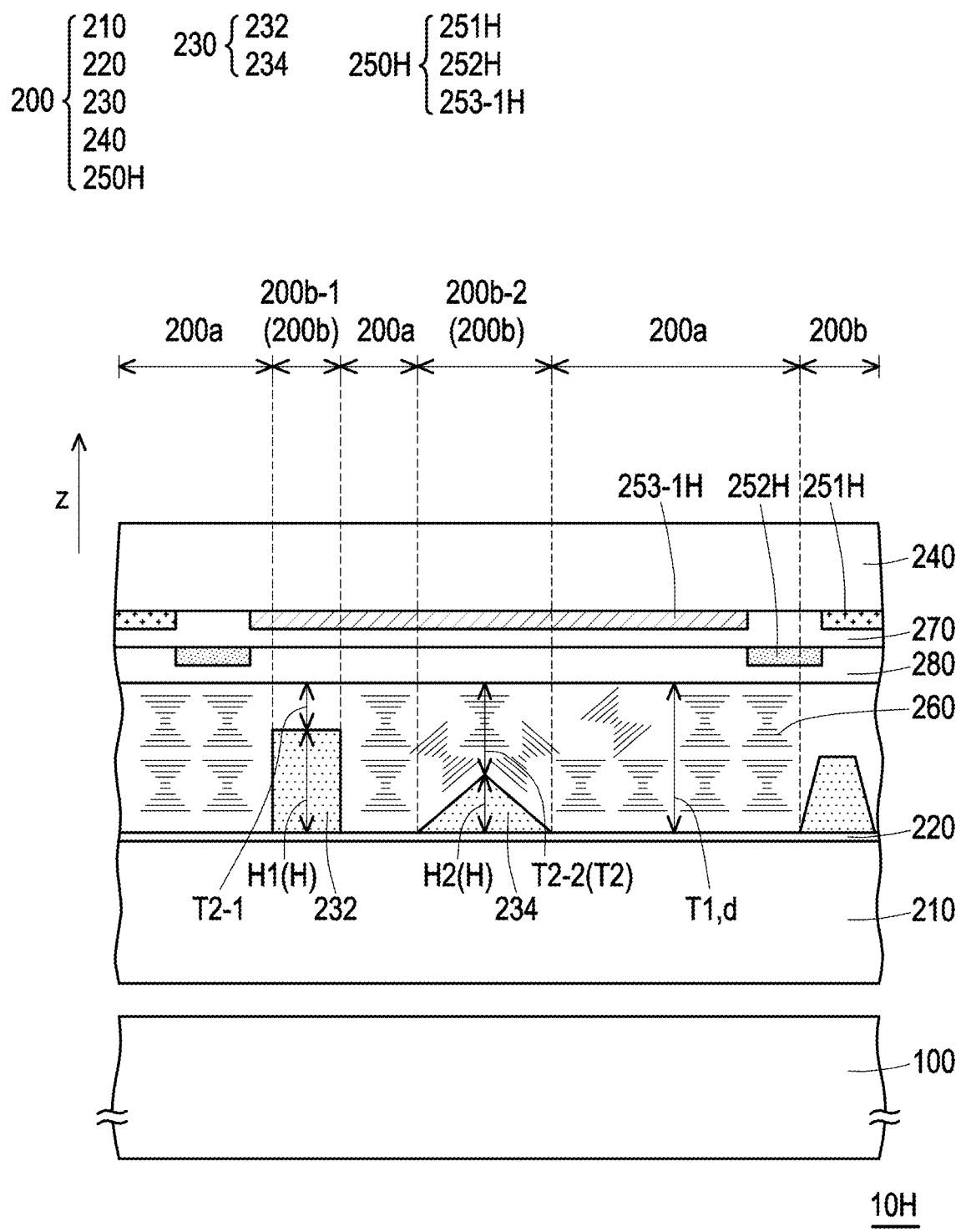
FIG. 21 is a schematic cross-sectional diagram of a display apparatus according to an embodiment of the disclosure.
Figure 22:
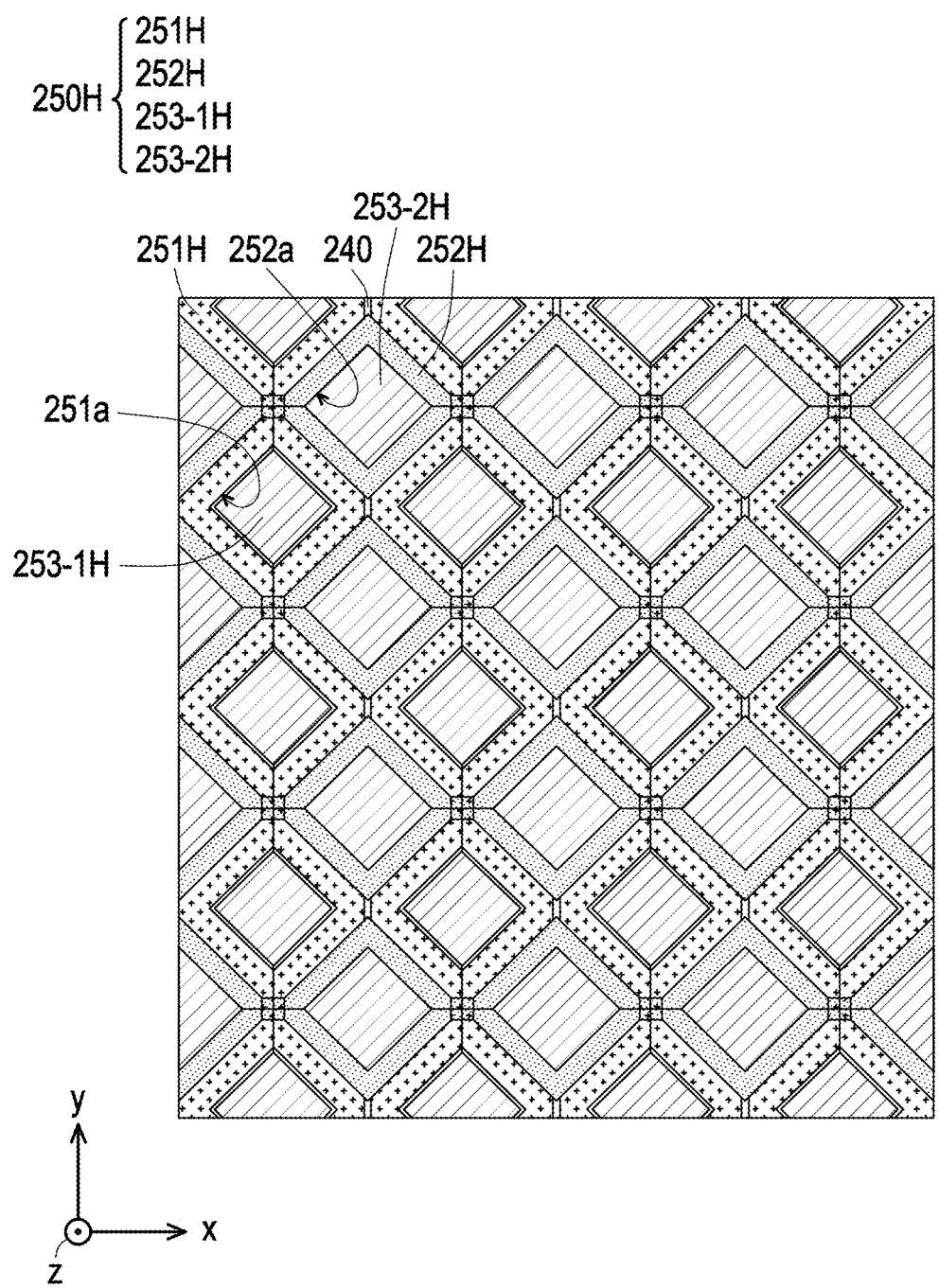
FIG. 22 is a schematic top and perspective diagram of a second substrate, a plurality of first touch-sensing electrodes, a plurality of second touch-sensing electrodes, a plurality of first dummy electrodes, and a plurality of second dummy electrodes of a display apparatus according to an embodiment of the disclosure.
Figure 23:
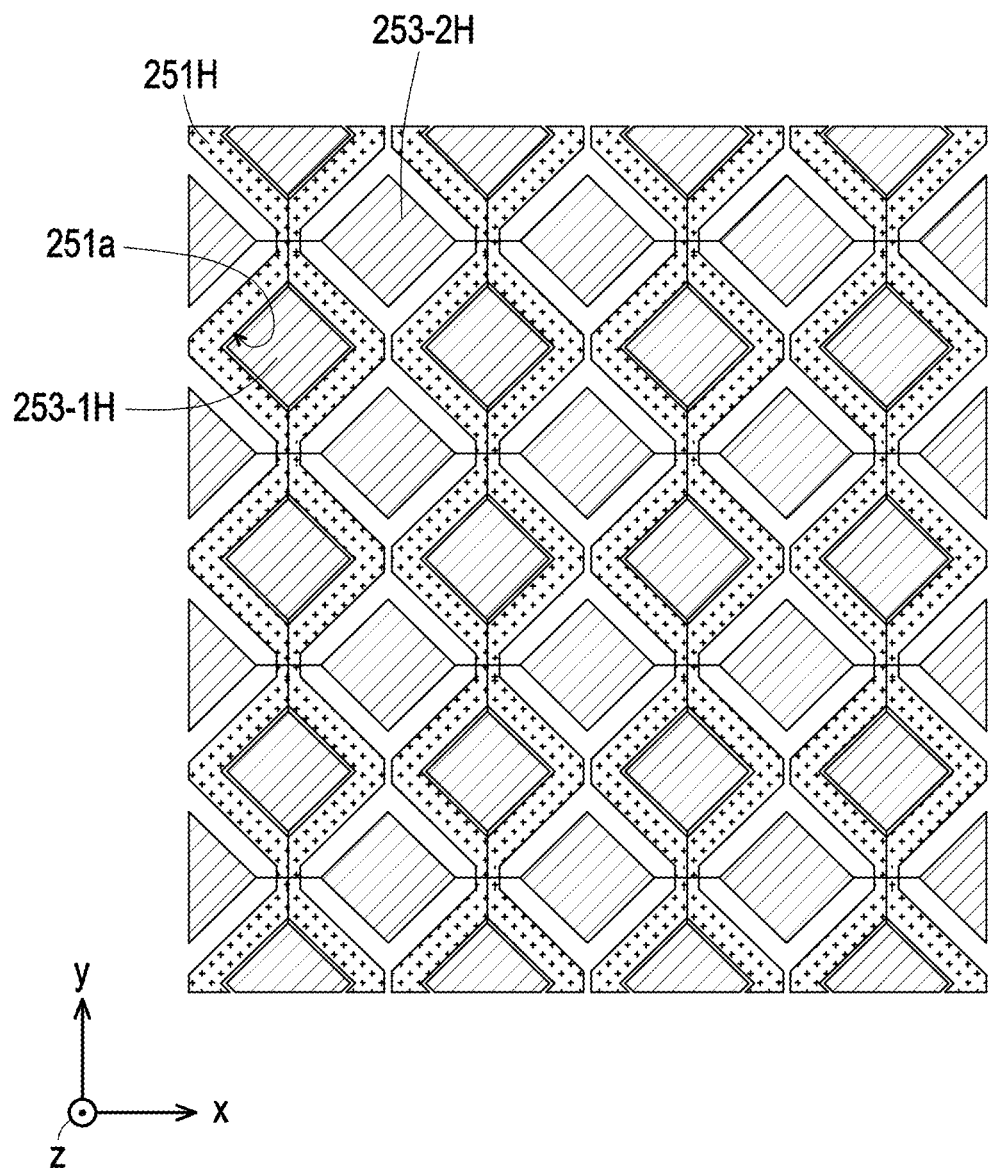
FIG. 23 is a schematic top and perspective diagram of a plurality of first touch-sensing electrodes, a plurality of first dummy electrodes, and a plurality of second dummy electrodes of a display apparatus according to an embodiment of the disclosure.
Figure 24:
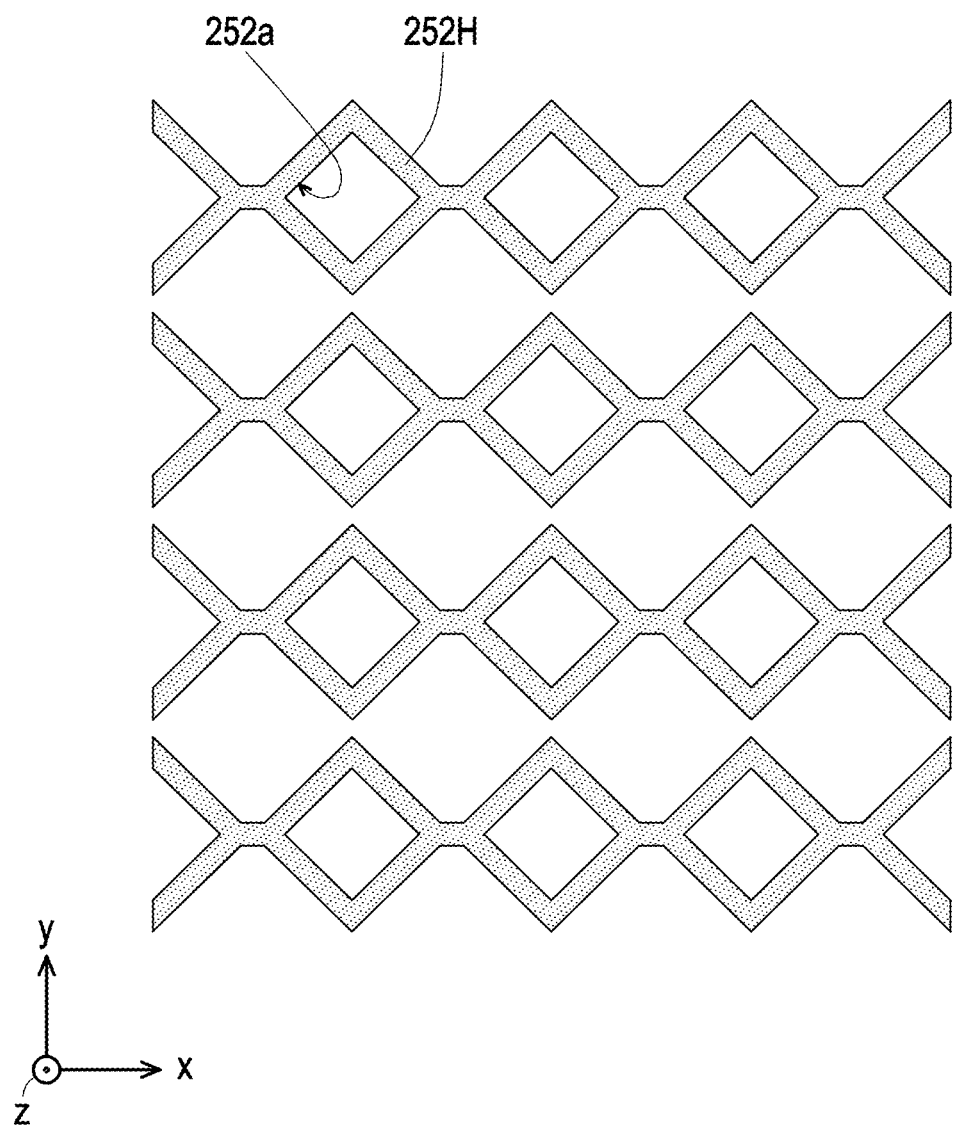
FIG. 24 is a schematic top and perspective diagram of a plurality of second touch-sensing electrodes of a display apparatus according to an embodiment of the disclosure.

FIG. 21 is a schematic cross-sectional diagram of a display apparatus according to an embodiment of the disclosure. FIG. 22 is a schematic top and perspective diagram of a second substrate, a plurality of first touch-sensing electrodes, a plurality of second touch-sensing electrodes, a plurality of first dummy electrodes, and a plurality of second dummy electrodes of a display apparatus according to an embodiment of the disclosure. FIG. 23 is a schematic top and perspective diagram of a plurality of first touch-sensing electrodes, a plurality of first dummy electrodes, and a plurality of second dummy electrodes of a display apparatus according to an embodiment of the disclosure. FIG. 24 is a schematic top and perspective diagram of a plurality of second touch-sensing electrodes of a display apparatus according to an embodiment of the disclosure.

A display apparatus 10H in FIG. 21 is similar to the display apparatus 10F in FIG. 12, and the difference between the two lies in that the film relationship among first touch-sensing electrodes 251H, second touch-sensing electrodes 252H, and first dummy electrodes 253-1H/second dummy electrodes 253-2H in the display apparatus 10H in FIG. 21 is not exactly the same as the film relationship among the first touch-sensing electrodes 251F, the second touch-sensing electrodes 252F, and the first dummy electrodes 253-1/the second dummy electrodes 253-2 in the display apparatus 10F in FIG. 12.

With reference to FIG. 21, FIG. 22, FIG. 23, and FIG. 24, specifically, in this embodiment, the second transparent conductive element 250H includes the first touch-sensing electrodes 251H, the second touch-sensing electrodes 252H, the first dummy electrodes 253-1H, and the second dummy electrodes 253-2H. The first touch-sensing electrodes 251H, the first dummy electrodes 253-1H, and the second dummy electrodes 253-2H are disposed between the second substrate 240 and the first insulation layer 270. The first insulation layer 270 is disposed between the first touch-sensing electrodes 251H and the second touch-sensing electrodes 252H, between the first dummy electrodes 253-1H and the second touch-sensing electrodes 252H, and between the second dummy electrodes 253-2H and the second touch-sensing electrodes 252H. Moreover, the second touch-sensing electrodes 252H are disposed between the first insulation layer 270 and the second insulation layer 280. In short, according to this embodiment, the first touch-sensing electrodes 251H and the second touch-sensing electrodes 252H belong to two different transparent conductive layers, and the first dummy electrodes 253-1H and the second dummy electrodes 253-2H and the first touch-sensing electrodes 251H belong to the same transparent conductive layer.

Figure 25:
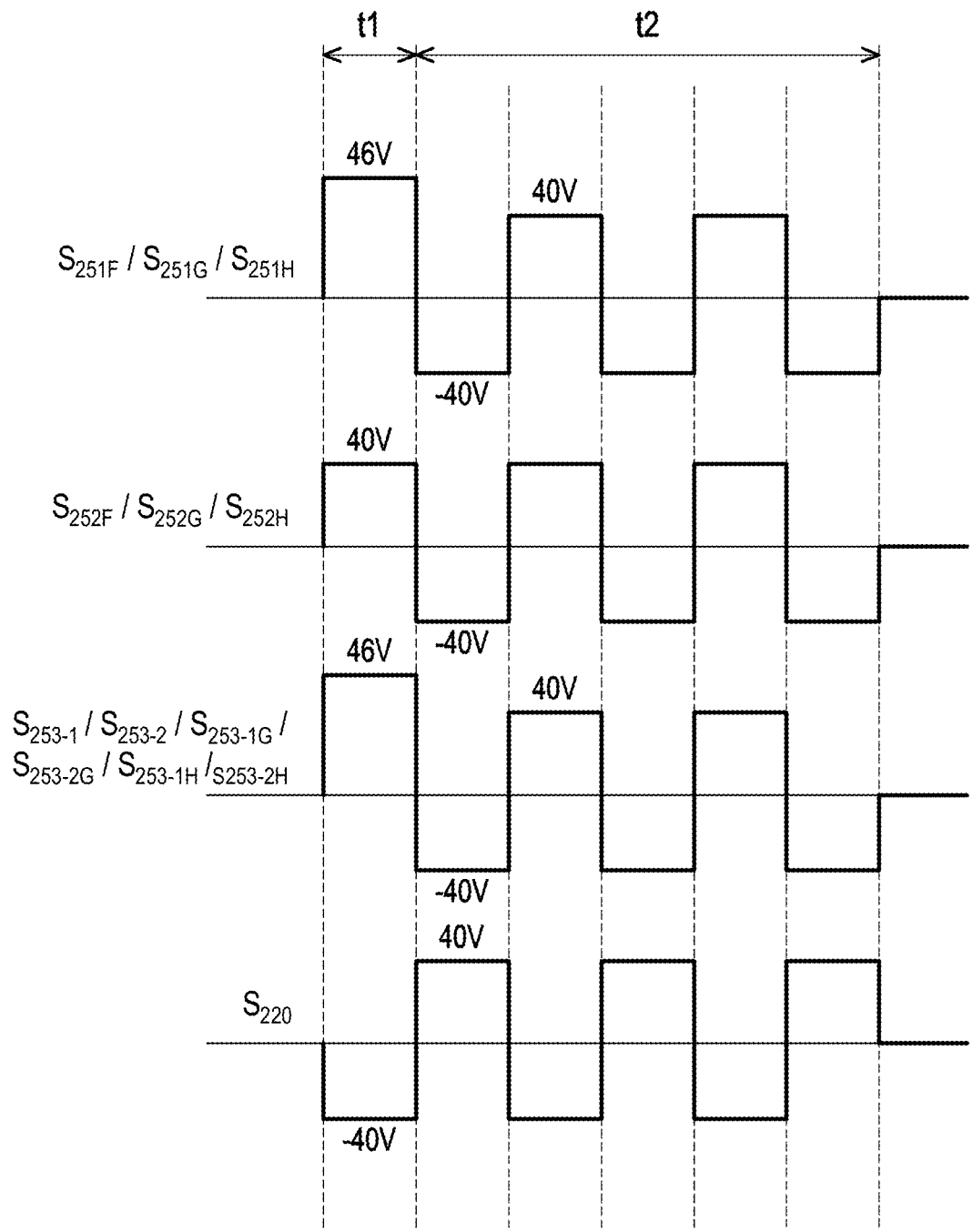
FIG. 25 illustrates signals of first touch-sensing electrodes, second touch-sensing electrodes, first dummy electrodes, second dummy electrodes, and a second transparent conductive element when a display apparatus is operated in a transparent mode according to an embodiment of the disclosure.

FIG. 25 illustrates signals of first touch-sensing electrodes, second touch-sensing electrodes, first dummy electrodes, second dummy electrodes, and a second transparent conductive element when a display apparatus is operated in a transparent mode according to an embodiment of the disclosure. Signals S251F of the first touch-sensing electrodes 251F, signals S252F of the second touch-sensing electrodes 252F, signals S253-1 of the first dummy electrodes 253-1, signals S253-2 of the second dummy electrode 253-2, and signals S220 of the first transparent conductive element 220 shown in FIG. 25 are adapted to the above-mentioned display apparatus 10F operated in the transparent mode. Signals S251G of the first touch-sensing electrodes 251G, signals S252G of the second touch-sensing electrodes 252G, signals S253-1G of the first dummy electrodes 253-1G, signals S253-2G of the second dummy electrodes 253-2G, and signals S220 of the first transparent conductive element 220 shown in FIG. 25 are adapted to the above-mentioned display apparatus 10G operated in the transparent mode. Signals S251H of the first touch-sensing electrodes 251H, signals S252H of the second touch-sensing electrodes 252H, signals S253-1H of the first dummy electrodes 253-1H, signals S253-2H of the second dummy electrodes 253-2H, and signals S220 of the first transparent conductive element 220 shown in FIG. 25 are adapted to the above-mentioned display apparatus 10H operated in the transparent mode.

With reference to FIG. 12 to FIG. 13, FIG. 17 to FIG. 18, FIG. 21 to FIG. 22, and FIG. 25, during a touch-sensing period t1, a potential difference exists between potentials of the first touch-sensing electrodes 251F/251G/251H and potentials of the second touch-sensing electrodes 252F/252G/252H operated in the transparent mode. The potentials of the first touch-sensing electrodes 251F/251G/251H, potentials of the first dummy electrode 253-1/253-1G/253-1H, and potentials of the second dummy electrodes 253-2/253-2G/253-2H are the same, and the potential of each of the first touch-sensing electrodes 251F/251G/251H, the second touch-sensing electrodes 252F/252G/252H, the first dummy electrodes 253-1/253-1G/253-1H, and the second dummy electrodes 253-2/253-2G/253-2H is different from a potential of the first transparent conductive element 220. For instance, during the operation in the transparent mode in the touch-sensing period t1, the signals $S_{251F}/S_{251G}/S_{251H}$ of the first touch-sensing electrodes 251F/251G/251H are 46V, the signals $S_{252F}/S_{252G}/S_{252H}$ of the second touch-sensing electrodes 252F/252G/252H are 40V, the signals $S_{251F}/S_{251G}/S_{251H}$ of the first touch-sensing electrodes 251F/251G/251H and the signals $S_{252F}/S_{252G}/S_{252H}$ of the second touch-sensing electrodes 252F/252G/252H have a potential difference of 6V, the signals $S_{251F}/S_{251G}/S_{251H}$ of the first touch-sensing electrodes 251F/251G/251H, the signals $S_{253-1}/S_{253-1G}/S_{253-1H}$ of the first dummy electrodes 253-1/253-1G/253-1H, and the signals $S_{253-2}/S_{253-2G}/S_{253-2H}$ of the second dummy electrodes 253-2/253-2G/253-2H are all equal to 46V, and the signal $S_{220}$ of the first transparent conductive element 220 is-40V, which is different from 46V and 40V.

Figure 26:
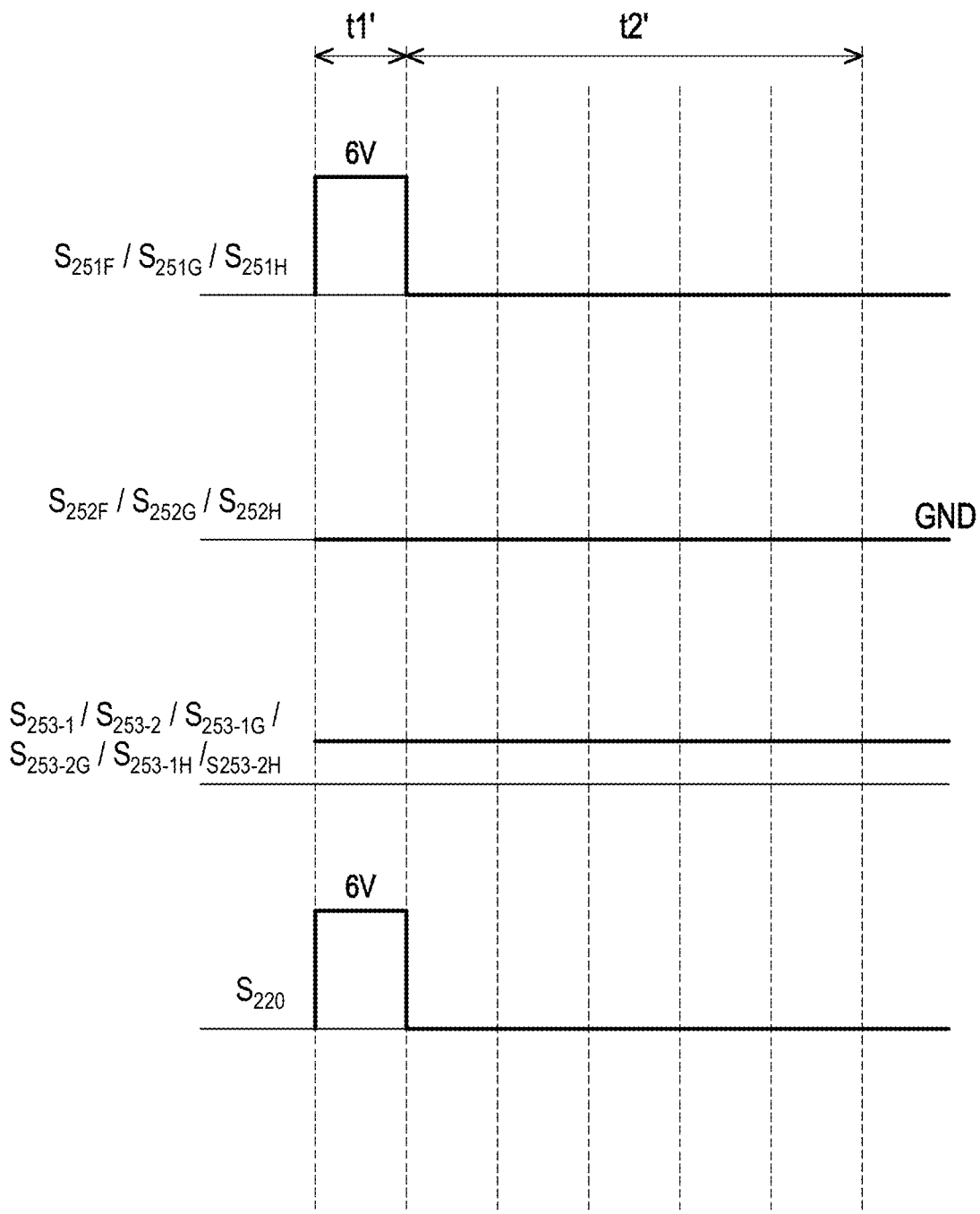
FIG. 26 illustrates signals of first touch-sensing electrodes, second touch-sensing electrodes, first dummy electrodes, second dummy electrodes, and a second transparent conductive element when a display apparatus is operated in a reflective mode according to an embodiment of the disclosure.

With reference to FIG. 12 to FIG. 13, FIG. 17 to FIG. 18, FIG. 21 to FIG. 22, and FIG. 25, during the operation in the transparent mode in a non-touch-sensing period t2 following the touch-sensing period t1, the potentials of the first touch-sensing electrodes 251F/251G/251H, the second touch-sensing electrodes 252F/252G/252H, the first dummy electrodes 253-1/253-1G/253-1H, and the second dummy electrodes 253-2/253-2G/253-2H are substantially the same, and the potential of each of the first touch-sensing electrodes 251F/251G/251H, the second touch-sensing electrodes 252F/252G/252H, the first dummy electrodes 253-1/253-1G/253-1H, and the second dummy electrodes 253-2/253-2G/253-2H is different from the potential of the first transparent conductive element 220. For instance, during the operation in the transparent mode in the non-touch-sensing period t2, the signals $S_{251F}/S_{251G}/S_{251H}$ of the first touch-sensing electrodes 251F/251G/251H, the signals $S_{252F}/S_{252G}/S_{252H}$ of the second touch-sensing electrodes 252F/252G/252H, the signals $S_{253-1}/S_{253-1G}/S_{253-1H}$ of the first dummy electrodes 253-1/253-1G/253-1H, the signals $S_{253-2}/S_{253-2G}/S_{253-2H}$ of the second dummy electrodes 253-2/253-2G/253-2H, and the signal $S_{220}$ of the first transparent conductive element 220 are all square waves with an amplitude of ±40V; the signals $S_{251F}/S_{251G}/S_{251H}$ of the first touch-sensing electrodes 251F/251G/251H, the signals $S_{252F}/S_{252G}/S_{252H}$ of the second touch-sensing electrodes 252F/252G/252H, the signals $S_{253-1}/S_{253-1G}/S_{253-1H}$ of the first dummy electrodes 253-1/253-1G/253-1H, and the signals $S_{253-2}/S_{253-2G}/S_{253-2H}$ of the second dummy electrodes 253-2/253-2G/253-2H are synchronized; each of the signals $S_{251F}/S_{251G}/S_{251H}$ of the first touch-sensing electrodes 251F/251G/251H, the signals $S_{252F}/S_{252G}/S_{252H}$ of the second touch-sensing electrodes 252F/252G/252H, the signals $S_{253-1}/S_{253-1G}/S_{253-1H}$ of the first dummy electrodes 253-1/253-1G/253-1H, and the signals $S_{253-2}/S_{253-2G}/S_{253-2H}$ of the second dummy electrodes 253-2/253-2G/253-2H is not synchronized with the signal $S_{220}$ of the first transparent conductive element 220; a polarity of each of the signals $S_{251F}/S_{251G}/S_{251H}$ of the first touch-sensing electrodes 251F/251G/251H, the signals $S_{252F}/S_{252G}/S_{252H}$ of the second touch-sensing electrodes 252F/252G/252H, the signals $S_{253-1}/S_{253-1G}/S_{253-1H}$ of the first dummy electrodes 253-1/253-1G/253-1H, and the signals $S_{253-2}/S_{253-2G}/S_{253-2H}$ of the second dummy electrodes 253-2/253-2G/253-2H is opposite to a polarity of the signal $S_{220}$ of the first transparent conductive element 220. FIG. 26 illustrates signals of first touch-sensing electrodes, second touch-sensing electrodes, first dummy electrodes, second dummy electrodes, and a second transparent conductive element when a display apparatus is operated in a reflective mode according to an embodiment of the disclosure. The signals $S_{251F}$ of the first touch-sensing electrodes 251F, the signals $S_{252F}$ of the second touch-sensing electrodes 252F, the signals $S_{253-1}$ of the first dummy electrodes 253-1, the signals $S_{253-2}$ of the second dummy electrodes 253-2, and the signal $S_{220}$ of the first transparent conductive element 220 shown in FIG. 26 are adapted to the above-mentioned display apparatus 10F operated in the reflective mode. The signals $S_{251G}$ of the first touch-sensing electrodes 251G, the signals $S_{252G}$ of the second touch-sensing electrodes 252G, the signals $S_{253-1G}$ of the first dummy electrodes 253-1G, the signals $S_{253-2G}$ of the second dummy electrodes 253-2G, and the signal $S_{220}$ of the first transparent conductive element 220 shown in FIG. 26 are adapted to the above-mentioned display apparatus 10G operated in the reflective mode. The signals $S_{251H}$ of the first touch-sensing electrodes 251H, the signals $S_{252H}$ of the second touch-sensing electrodes 252H, the signals $S_{253-1H}$ of the first dummy electrodes 253-1H, the signals $S_{253-2H}$ of the second dummy electrodes 253-2H, and the signal $S_{220}$ of the first transparent conductive element 220 shown in FIG. 26 are adapted to the above-mentioned display apparatus 10H operated in the reflective mode.

With reference to FIG. 12 to FIG. 13, FIG. 17 to FIG. 18, FIG. 21 to FIG. 22, and FIG. 26, during a touch-sensing period t1', a potential difference exists between potentials of the first touch-sensing electrodes 251F/251G/251H and potentials of the second touch-sensing electrodes 252F/252G/252H operated in the reflective mode. The first dummy electrodes 253-1/253-1G/253-1H and the second dummy electrodes 253-2/253-2G/253-2H are floating, and the potentials of the first touch-sensing electrodes 251F/251G/251H are substantially the same as the potential of the first transparent conductive element 220. For instance, during the operation in the reflective mode in the touch-sensing period t1', the signals S251F/S251G/S251H of the first touch-sensing electrodes 251F/251G/251H are 6V, the signals S252F/S252G/S252H of the second touch-sensing electrodes 252F/252G/252H have the grounded potential, the signals $S_{251F}/S_{251G}/S_{251H}$ of the first touch-sensing electrodes 251F/251G/251H and the signals $S_{252F}/S_{252G}/S_{252H}$ of the second touch-sensing electrodes 252F/252G/252H have the potential difference of 6V, the signals $S_{251F}/S_{251G}/S_{251H}$ of the first touch-sensing electrodes 251F/251G/251H and the signal $S_{220}$ of the first transparent conductive element 220 are square waves with the same amplitude and are synchronized, and there is no potential difference between the potentials of the signals $S_{251F}/S_{251G}/S_{251H}$ of the first touch-sensing electrodes 251F/251G/251H and the potential of the signal $S_{220}$ of the first transparent conductive element 220.

With reference to FIG. 12 to FIG. 13, FIG. 17 to FIG. 18, FIG. 21 to FIG. 22, and FIG. 26, during the operation in the reflective mode in a non-touch-sensing period t2' following the touch-sensing period t1', the potential of each of the first touch-sensing electrodes 251F/251G/251H and the second touch-sensing electrodes 252F/252G/252H is the same as the potential of the potential of the first transparent conductive element 220, and the first dummy electrodes 253-1/253-1G/253-1H and the second dummy electrodes 253-2/253-2G/253-2H are floating. For instance, during the operation in the reflective mode in the non-touch-sensing period t2', each of the first touch-sensing electrodes 251F/251G/251H and the second touch-sensing electrodes 252F/252G/252H has the same grounded potential.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A decoration panel, comprising:
    a first substrate;
    a first transparent conductive element, disposed on the first substrate;
    a transparent structure, disposed on the first substrate;
    a second substrate, disposed opposite to the first substrate;
    a second transparent conductive element, disposed on the second substrate; and
    a first cholesteric liquid crystal layer, disposed between the first transparent conductive element and the second transparent conductive element,
    wherein the decoration panel is adapted to render a decoration pattern, and the decoration pattern corresponds to the transparent structure;
    wherein the transparent structure protrudes from the first transparent conductive element;
    wherein the second transparent conductive element is located between the second substrate and the first cholesteric liquid crystal layer, the second transparent conductive element comprises a plurality of first touch-sensing electrodes and a plurality of second touch-sensing electrodes, the first touch-sensing electrodes are structurally separated from each other, the second touch-sensing electrodes are structurally separated from each other, and the first touch-sensing electrodes and the second touch-sensing electrodes are alternately arranged;
    wherein the first touch-sensing electrodes have a plurality of first openings, the second transparent conductive element further comprises a plurality of first dummy electrodes, the first dummy electrodes are respectively overlapped with the first openings of the first touch-sensing electrodes, and the first dummy electrodes are electrically connected.

2. The decoration panel as claimed in claim 1, wherein the decoration pattern and the transparent structure are substantially overlapped.

3. The decoration panel as claimed in claim 1, wherein when the decoration panel is not enabled, the first cholesteric liquid crystal layer is in a reflective mode, and the decoration panel renders the decoration pattern.

4. The decoration panel as claimed in claim 1, wherein when the decoration panel is enabled, the first cholesteric liquid crystal layer is in a transmissive mode.

5. The decoration panel as claimed in claim 1, wherein a direction is perpendicular to the first substrate, the first transparent conductive element and the second transparent conductive element are spaced from each other by a maximum distance in the direction, the transparent structure has a height in the direction, the maximum distance is d, the height of the transparent structure is H, and d and H satisfy:

$$0 \le \frac{(d-H)}{d} < 1.$$

6. The decoration panel as claimed in claim 1, wherein the transparent structure comprises a first portion and a second portion of different heights.

7. The decoration panel as claimed in claim 1, further comprising:
    a third transparent conductive layer, wherein the second substrate is located between the third transparent conductive layer and the second transparent conductive element;
    a second cholesteric liquid crystal layer, wherein the third transparent conductive layer is located between the second cholesteric liquid crystal layer and the second substrate;
    a fourth transparent conductive layer, wherein the second cholesteric liquid crystal layer is located between the fourth transparent conductive layer and the third transparent conductive layer; and
    a third substrate, wherein the fourth transparent conductive layer is located between the third substrate and the second cholesteric liquid crystal layer,
    and a pitch of the first cholesteric liquid crystal layer is different from a pitch of the second cholesteric liquid crystal layer.

8. The decoration panel as claimed in claim 1, wherein the second touch-sensing electrodes have a plurality of second openings, the second transparent conductive element further comprises a plurality of second dummy electrodes, the second dummy electrodes are respectively overlapped with the second openings of the second touch-sensing electrodes, and the first dummy electrodes and the second dummy electrodes are electrically connected.

9. The decoration panel as claimed in claim 8, wherein the decoration panel is operated in a transparent mode, during a touch-sensing period, a potential difference exists between a potential of one of the first touch-sensing electrodes and a potential of one of the second touch-sensing electrodes, the potential of the one of the first touch-sensing electrodes, potentials of the first dummy electrodes, and potentials of the second dummy electrodes are identical, and the potential of the one of the first touch-sensing electrodes, the potential of the one of the second touch-sensing electrodes, the potential of each of the first dummy electrodes, and the potential of each of the second dummy electrodes are different from a potential of the first transparent conductive element.

10. The decoration panel as claimed in claim 9, wherein during a non-touch-sensing period following the touch-sensing period, the potential of the one of the first touch-sensing electrodes, the potential of the one of the second touch-sensing electrodes, the potentials of the first dummy electrodes, and the potentials of the second dummy electrodes are substantially the same, and the potential of the one of the first touch-sensing electrodes, the potential of the one of the second touch-sensing electrodes, the potential of each of the first dummy electrodes, and the potential of each of the second dummy electrodes are different from the potential of the first transparent conductive element.

11. The decoration panel as claimed in claim 8, wherein the decoration panel is operated in a reflective mode, during a touch-sensing period, a potential difference exists between a potential of one of the first touch-sensing electrodes and a potential of one of the second touch-sensing electrodes, the first dummy electrodes and the second dummy electrodes are floating, and the potential of the one of the first touch-sensing electrodes is substantially the same as a potential of the first transparent conductive element.

12. The decoration panel as claimed in claim 11, wherein during a non-touch-sensing period following the touch-sensing period, the potential of each of the one of the first touch-sensing electrodes and the one of the second touch-sensing electrodes and the potential of the first transparent conductive element are the same, and the first dummy electrodes and the second dummy electrodes are floating.

13. A display apparatus, comprising:
a display panel;
a decoration panel, disposed above the display panel and comprising:
a first substrate;
a first transparent conductive element, disposed on the first substrate;
a transparent structure, disposed on the first substrate;
a second substrate, disposed opposite to the first substrate;
a second transparent conductive element, disposed on the second substrate; and
a first cholesteric liquid crystal layer, disposed between the first transparent conductive element and the second transparent conductive element,
wherein the display apparatus is adapted to render a decoration pattern, and the decoration pattern corresponds to the transparent structure;
wherein the transparent structure protrudes from the first transparent conductive element;
wherein the second transparent conductive element is located between the second substrate and the first cholesteric liquid crystal layer, the second transparent conductive element comprises a plurality of first touch-sensing electrodes and a plurality of second touch-sensing electrodes, the first touch-sensing electrodes are structurally separated from each other, the second touch-sensing electrodes are structurally separated from each other, and the first touch-sensing electrodes and the second touch-sensing electrodes are alternately arranged;
wherein the first touch-sensing electrodes have a plurality of first openings, the second transparent conductive element further comprises a plurality of first dummy electrodes, the first dummy electrodes are respectively overlapped with the first openings of the first touch-sensing electrodes, and the first dummy electrodes are electrically connected.

14. The display apparatus as claimed in claim 13, wherein the decoration pattern and the transparent structure are substantially overlapped.

15. The display apparatus as claimed in claim 13, wherein the transparent structure comprises a first portion and a second portion of different heights.

16. The display apparatus as claimed in claim 13, wherein the second touch-sensing electrodes have a plurality of second openings, the second transparent conductive element further comprises a plurality of second dummy electrodes, the second dummy electrodes are respectively overlapped with the second openings of the second touch-sensing electrodes, and the first dummy electrodes and the second dummy electrodes are electrically connected.

17. The display apparatus as claimed in claim 16, wherein the decoration panel is operated in a transparent mode, during a touch-sensing period, a potential difference exists between a potential of one of the first touch-sensing electrodes and a potential of one of the second touch-sensing electrodes, the potential of the one of the first touch-sensing electrodes, potentials of the first dummy electrodes, and potentials of the second dummy electrodes are identical, and the potential of the one of the first touch-sensing electrodes, the potential of the one of the second touch-sensing electrodes, the potential of each of the first dummy electrodes, and the potential of each of the second dummy electrodes are different from a potential of the first transparent conductive element; during a non-touch-sensing period following the touch-sensing period, the potential of the one of the first touch-sensing electrodes, the potential of the one of the second touch-sensing electrodes, the potentials of the first dummy electrodes, and the potentials of the second dummy electrodes are substantially the same, and the potential of the one of the first touch-sensing electrodes, the potential of the one of the second touch-sensing electrodes, the potential of each of the first dummy electrodes, and the potential of each of the second dummy electrodes are different from the potential of the first transparent conductive element.

18. The display apparatus as claimed in claim 16, wherein the decoration panel is operated in a reflective mode, during a touch-sensing period, a potential difference exists between a potential of one of the first touch-sensing electrodes and a potential of one of the second touch-sensing electrodes, the first dummy electrodes and the second dummy electrodes are floating, and the potential of the one of the first touch-sensing electrodes is substantially the same as a potential of the first transparent conductive element; during a non-touch-sensing period following the touch-sensing period, the potential of each of the one of the first touch-sensing electrodes and the one of the second touch-sensing electrodes and the potential of the first transparent conductive element are the same, and the first dummy electrodes and the second dummy electrodes are floating.

* * * * *